(12) United States Patent
Dick et al.

(10) Patent No.: US 10,944,444 B2
(45) Date of Patent: Mar. 9, 2021

(54) METHOD OF AND CIRCUIT FOR PREDISTORTION FOR A CABLE TV AMPLIFIER

(71) Applicant: Xilinx, Inc., San Jose, CA (US)

(72) Inventors: Christopher H. Dick, San Jose, CA (US); Hongzhi Zhao, Los Gatos, CA (US); Hemang M. Parekh, San Jose, CA (US); Xiaohan Chen, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/142,295

(22) Filed: Sep. 26, 2018

(65) Prior Publication Data

US 2020/0099416 A1 Mar. 26, 2020

(51) Int. Cl.
| | | |
|---|---|---|
| *H04B 3/06* | (2006.01) | |
| *H04B 1/04* | (2006.01) | |
| *H04N 7/10* | (2006.01) | |
| *H04L 25/03* | (2006.01) | |

(52) U.S. Cl.
CPC ............. *H04B 3/06* (2013.01); *H04B 1/0475* (2013.01); *H04L 25/03057* (2013.01); *H04N 7/102* (2013.01); *H04B 2001/045* (2013.01)

(58) Field of Classification Search
CPC .......... H04B 1/0475; H04B 2001/0425; H04B 7/06; H04B 2001/045; H04L 25/03343; H04L 25/03159; H04L 2025/03356; H04L 25/03057; H04N 7/102
See application file for complete search history.

(56) References Cited

U.S. PATENT DOCUMENTS

| | | | |
|---|---|---|---|
| 8,837,633 B2 | 9/2014 | Dick | |
| 9,014,241 B2 | 4/2015 | Dick | |
| 9,337,886 B1 | 5/2016 | Dick | |
| 9,338,039 B1 | 5/2016 | Barnes | |
| 10,033,413 B2* | 7/2018 | Pratt | .............. H04B 1/0475 |

(Continued)

OTHER PUBLICATIONS

Ghannouchi, Fadhel M., et al., Behavioral Modeling and Predistortion of Wideband Wireless Transmitters, pp. 120-121, May 15, 2015, John Wiley & Sons Ltd.

(Continued)

*Primary Examiner* — Janice N Tieu
(74) *Attorney, Agent, or Firm* — Haynes and Boone, LLP

(57) ABSTRACT

A digital predistortion (DPD) system includes an input configured to receive a DPD input signal. In some embodiments, a non-linear datapath is coupled to the input, where the non-linear datapath includes a plurality of parallel datapath elements each coupled to the input. By way of example, each of the plurality of parallel datapath elements is configured to add a different inverse non-linear component to the DPD input signal corresponding to a non-linear component of an amplifier. In various examples, a first combiner combines an output of each of the plurality of datapath elements to generate a first predistortion signal. In some embodiments, the DPD system further includes a linear datapath coupled to the input in parallel with the non-linear datapath to generate a second predistortion signal. In addition, a second combiner combines the first predistortion signal and the second predistortion signal to generate a DPD output signal.

20 Claims, 17 Drawing Sheets

(56) References Cited

U.S. PATENT DOCUMENTS

2010/0254441 A1\* 10/2010 Kenington ............ H03F 1/3247
375/214
2016/0065147 A1\* 3/2016 Pratt ..................... H03F 1/3247
330/75
2017/0104503 A1\* 4/2017 Pratt .................. H04B 1/71635
2017/0141736 A1 5/2017 Pratt
2017/0338841 A1\* 11/2017 Pratt .................... H04B 1/0475
2017/0338842 A1\* 11/2017 Pratt .................... H04B 1/0475

OTHER PUBLICATIONS

PCT Application No. PCT/US2019/050435 filed Dec. 17, 2019; Notification of Transmittal of the International Search Report and the Written Opinion of the International Searching Authority or the Declaration.

\* cited by examiner

| CATV Amplifier Under Test, Vd =34V. DOCSIS 3.1 Specs : 41dB, 4KQAM, 76.8dBmv/75Ω. | | | | | | |
|---|---|---|---|---|---|---|
| Data MER | 1st Carrier (204MHz, 4k QAM) | 2nd Carrier (396MHz, 4k QAM) | 3rd Carrier (588MHz, 4k QAM) | 4th Carrier (786MHz, 4k QAM, 96MHz) | 5th Carrier (930MHz, 4k QAM) | 6th Carrier (1122MHz, 4k QAM) |
| Bias 530mA No DPD | 41.82 dB | 43.10 dB | 42.40 dB | | 41.65 dB | 40.80 dB |
| Bias 530mA DPD | 46.57 dB | 47.80 dB | 47.67 dB | | 44.14 dB | 43.61 dB |
| Bias 440mA (3W/Amplifier) | 36.61 dB | 37.14 dB | 36.70 dB | | 36.26 dB | 36.81 dB |
| Bias 440mA DPD (3W/Amplifier) | 41.565 dB | 43.58 dB | 43.86 dB | | 43.14 dB | 41.41 dB |

FIG. 16

METHOD OF AND CIRCUIT FOR PREDISTORTION FOR A CABLE TV AMPLIFIER

TECHNICAL FIELD

Examples of the present disclosure generally relate to integrated circuits ("ICs") and, in particular, to an embodiment related to performing digital predistortion for cable TV (CATV) amplifiers.

BACKGROUND

To meet the demands for higher data rates of internet, telephony, and video services, the cable industry is deploying a new high data rate and wideband Remote PHY node based on the new Data Over Cable Service Interface Specification (DOCSIS) 3.1 standards. DOCSIS 3.1 supports 4096 quadrature amplitude modulation (QAM) and uses orthogonal frequency division multiplexing (OFDM). As such, the transmitted signal quality requirement for DOCSIS 3.1 is much higher than for the current standard DOCSIS 3.0. Due to the more sophisticated functions associated with DOCSIS 3.1, cable television (CATV) amplifiers may operate in a non-linear region. The non-linear effects of a CATV amplifier will significantly degrade a transmitted signal quality. In addition, the new components that provide the high data rates and more sophisticated functions of DOCSIS 3.1 will themselves consume power. However, since the power supply to each node (e.g., each remote PHY node) is fixed, the power consumption of other components (e.g., such as the CATV amplifiers) should be reduced. Thus, while it is desirable to provide the advanced performance of DOCSIS 3.1, it has been challenging to do so while providing an improved transmitted signal quality and a reduced power consumption of other components (e.g., such as CATV amplifiers).

Accordingly, there is a need for improved methods and circuits for predistortion for CATV amplifiers.

SUMMARY

In some embodiments in accordance with the present disclosure, a digital predistortion (DPD) system includes an input configured to receive a DPD input signal. In some embodiments, the DPD system further includes a non-linear datapath coupled to the input, where the non-linear datapath includes a plurality of parallel datapath elements each coupled to the input, where each of the plurality of parallel datapath elements is configured to add a different inverse non-linear component to the DPD input signal corresponding to a non-linear component of an amplifier, and where a first combiner is configured to combine an output of each of the plurality of parallel datapath elements to generate a first predistortion signal. In some embodiments, the DPD system further includes a linear datapath coupled to the input in parallel with the non-linear datapath to generate a second predistortion signal, and a second combiner configured to combine the first predistortion signal and the second predistortion signal to generate a DPD output signal.

In some embodiments, the plurality of parallel datapath elements includes a baseband DPD datapath, a video bandwidth DPD datapath, a 2nd harmonics DPD datapath, and a 3rd harmonics DPD datapath.

In some embodiments, the baseband DPD datapath is configured to add an inverse non-linear baseband component to the DPD input signal.

In some embodiments, the video bandwidth DPD datapath is configured to add an inverse non-linear video bandwidth component to the DPD input signal.

In some embodiments, the $2^{nd}$ harmonics DPD datapath is configured to add an inverse $2^{nd}$ harmonics component to the DPD input signal.

In some embodiments, the $3^{rd}$ harmonics DPD datapath is configured to add an inverse $3^{rd}$ harmonics component to the DPD input signal.

In some embodiments, the DPD system further includes a digital tilt filter configured to model an analog tilt filter, where a digital tilt filter input is coupled to the input, and where a digital tilt filter output is coupled to the non-linear datapath.

In some embodiments, the DPD system further includes a digital tilt equalizer configured to model an inverse of an analog tilt filter, where a digital tilt equalizer input is configured to receive the first predistortion signal, and where the second combiner is configured to combine a digital tilt equalizer output to the second predistortion signal to generate the DPD output signal.

In some embodiments, the DPD system further includes a single side band Hilbert filter, where a single side band Hilbert filter input is configured to receive the first predistortion signal, and where a single side band Hilbert filter output is coupled to the digital tilt equalizer input.

In some embodiments, the DPD output signal is coupled to an amplifier input to generate an amplified output signal, and the DPD output signal is configured to compensate for a plurality of non-linear components of the amplifier.

In some embodiments in accordance with the present disclosure, a digital front-end (DFE) system, configured to perform a digital predistortion (DPD) process, includes a digital upconverter (DUC) configured to receive and translate a baseband data input signal to generate a composite signal. In some embodiments, the DFE system further includes a DPD system configured to receive the composite signal at a DPD input and perform the DPD process to the composite signal, where the DPD input is coupled to a plurality of parallel datapath elements, where at least one of the plurality of parallel datapath elements is configured to add an inverse harmonic component to the composite signal corresponding to a non-linear harmonic component of an amplifier, where a combiner is configured to combine an output of each of the plurality of datapath elements to generate a DPD output signal, and where the DPD output signal is coupled to the amplifier. In some embodiments, the DPD output signal is configured to compensate for the non-linear harmonic component of the amplifier.

In some embodiments, the plurality of parallel datapath elements includes a baseband DPD datapath, a video bandwidth DPD datapath, a 2nd harmonics DPD datapath, and a 3rd harmonics DPD datapath.

In some embodiments, the DUC is configured to perform an interpolation process to the baseband data input signal to generate an interpolated signal, and the DUC is configured to perform a mixing process to the interpolated signal to generate the composite signal.

In some embodiments, the DPD system further includes a digital tilt filter configured to model an analog tilt filter, where a digital tilt filter input is configured to receive the composite signal, and where a digital tilt filter output is coupled to the plurality of parallel datapath elements.

In some embodiments, the DPD system further includes a digital tilt equalizer configured to model an inverse of an analog tilt filter, where a digital tilt equalizer input is configured to receive the combined output of each of the plurality of datapath elements, and where another combiner is configured to combine a digital tilt equalizer output to a linear DPD signal to generate the DPD output signal.

In some embodiments in accordance with the present disclosure, a method includes receiving a DPD input signal at an input of a digital predistortion (DPD) system. In some embodiments, the method further includes receiving the DPD input signal at a non-linear datapath coupled to the input of the DPD system, where the non-linear datapath includes a plurality of parallel datapath elements each coupled to the input. In some embodiments, the method further includes adding, by each of the plurality of parallel datapath elements, an inverse non-linear component to the DPD input signal corresponding to a non-linear component of an amplifier. In some embodiments, the method further includes combining, by a first combiner, an output of each of the plurality of parallel datapath elements to generate a first predistortion signal. In some embodiments, the method further includes receiving the DPD input signal at a linear datapath coupled to the input in parallel with the non-linear datapath to generate a second predistortion signal. In some embodiments, the method further includes combining, by a second combiner, the first predistortion signal and the second predistortion signal to generate a DPD output signal.

In some embodiments, the plurality of parallel datapath elements includes a baseband DPD datapath, a video bandwidth DPD datapath, a 2nd harmonics DPD datapath, and a 3rd harmonics DPD datapath.

In some embodiments, the method further includes adding, by the baseband DPD datapath, an inverse non-linear baseband component to the DPD input signal; adding, by the video bandwidth DPD datapath, an inverse non-linear video bandwidth component to the DPD input signal; adding, by the 2nd harmonics DPD datapath, an inverse 2nd harmonics component to the DPD input signal; and adding, by the 3rd harmonics DPD datapath, an inverse 3rd harmonics component to the DPD input signal.

In some embodiments, the method further includes providing the DPD output signal to an amplifier input to generate an amplified output signal, where the DPD output signal is configured to compensate for a plurality of non-linear components of the amplifier.

In some embodiments, the method further includes responsive to providing the DPD output signal to the amplifier and while operating the amplifier in a non-linear region, reducing a power consumption of the amplifier.

Other aspects and features will be evident from reading the following detailed description and accompanying drawings.

BRIEF DESCRIPTION OF THE DRAWINGS

FIG. 16 provides a table including modulation error ratio (MER) data for a CATV amplifier showing the effect of applying the corrections provided by the DPD system on the MER data, according to some embodiments.

DETAILED DESCRIPTION

Figure 1:
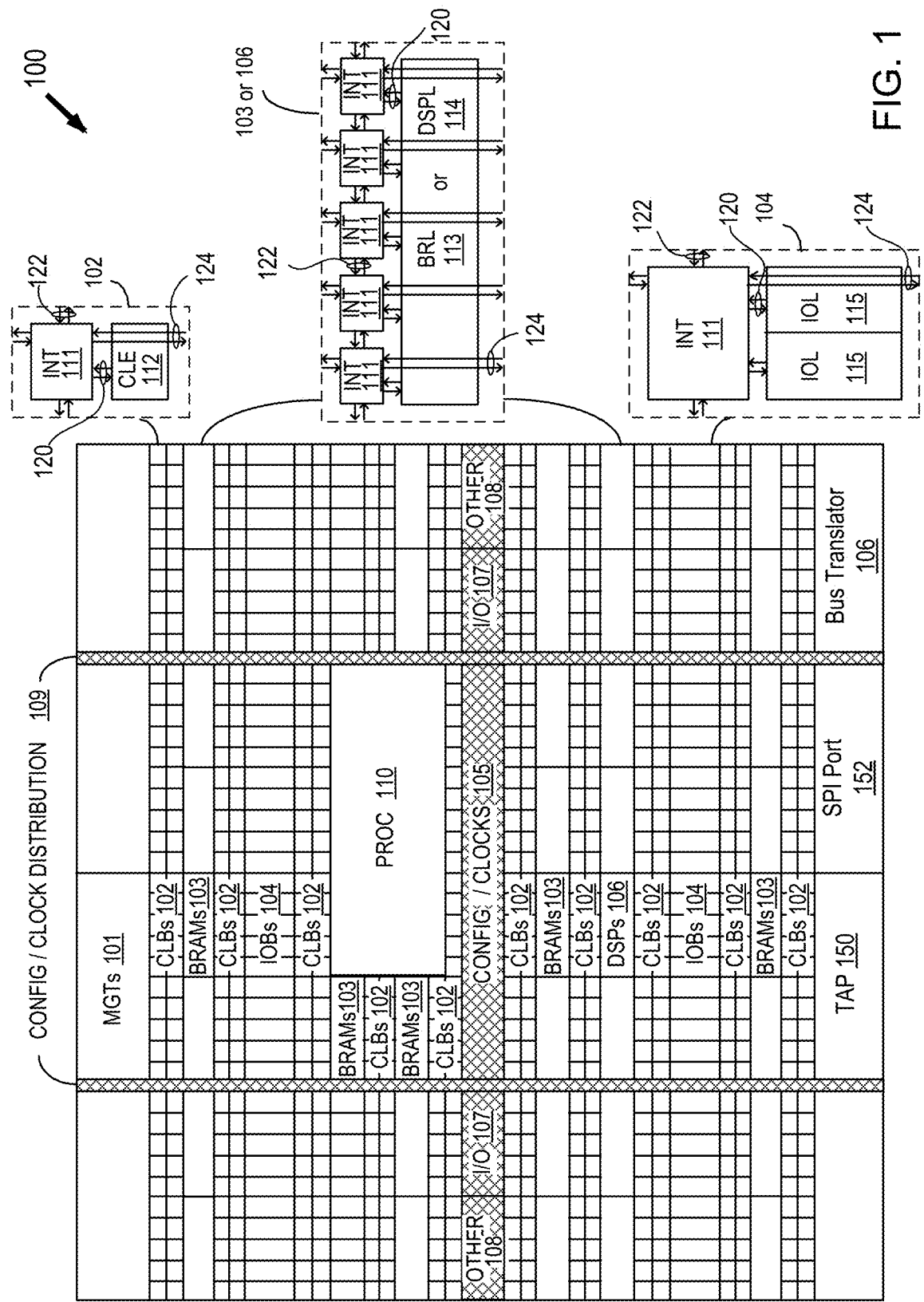
FIG. 1 is a block diagram illustrating an exemplary architecture for an IC, according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding.

As discussed above, the cable industry is deploying a new high data rate and wideband Remote PHY node based on the DOCSIS 3.1 standards to meet the demands for higher data rates of internet, telephony, and video services. DOCSIS 3.1 supports 4096 (4K) quadrature amplitude modulation (QAM) and uses orthogonal frequency division multiplexing (OFDM). As such, the transmitted signal quality requirement for DOCSIS 3.1 is much higher than for the current standard DOCSIS 3.0. Due to the more sophisticated functions associated with DOCSIS 3.1, cable television (CATV)

amplifiers may operate in a non-linear region. The non-linear effects of a CATV amplifier will significantly degrade a transmitted signal quality. In addition, the new components that provide the high data rates and more sophisticated functions of DOCSIS 3.1 will themselves consume power. However, since the power supply to each node (e.g., each remote PHY node) is fixed, the power consumption of other components (e.g., such as the CATV amplifiers) should be reduced. Thus, while it is desirable to provide the advanced performance of DOCSIS 3.1, it has been challenging to do so while providing an improved transmitted signal quality and a reduced power consumption of other components (e.g., such as CATV amplifiers).

In at least some existing techniques, a tilt equalizer (tilt filter) with deep attenuation up to 22 dB over the 1.2 GHz cable spectrum is implemented in an analog transmit path to compensate for coaxial cable loss (e.g., from CATV amplifier to cable modem). However, a DOCSIS 3.1 waveform using 4K QAM OFDM modulation shows a high peak-to-average power ratio (PAPR) as compared to the current DOCSIS 3.0 standard. As such, for the same RMS power output of a CATV amplifier in DOCSIS 3.0, the peak of a DOCSIS 3.1 waveform will be in the non-linear region of the CATV amplifier. Thus, transmitted signal quality is degraded. Digital predistortion (DPD) can be used to improve the signal quality for a CATV amplifier, for example, by causing the CATV to operate in a higher efficiency region. DPD has been used for wireless communication technologies where signal bandwidth is much more narrow than that used for cable communication technologies. Further, in wireless communications, harmonics of the non-linear effects of the wireless components do not fall into the signal bandwidth. As such, DPD for wireless communications need only model the non-linear components projected around the baseband frequency. However, for cable applications, harmonics of the non-linear effects of the CATV amplifier signal fall into the signal bandwidth. Therefore, DPD implementations for cable applications should model the harmonic components of the non-linear effects for the CATV amplifier. Separately, the tilt equalizer with deep attenuation cannot be implemented in the digital domain, and a digital tilt equalizer implementation will degrade the transmitting waveform quality of lower frequency carriers due to the finite digital resolution of a digital-to-analog converter (DAC). For integrated circuit (IC) solutions, it has been discovered that DPD data paths, implemented within a digital front-end (DFE) chip, can provide a solution to modeling the harmonic components of the non-linear effects for the CATV amplifier and the deep attenuation over the transmitting spectrum in CATV amplifiers. Thus, embodiments of the present disclosure provide for improved transmitted signal quality and reduced power consumption of the CATV amplifiers.

With the above general understanding borne in mind, various embodiments for providing methods and circuits for predistortion for CATV amplifiers are generally described below. Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110. In some embodiments, the FPGA architecture 100 includes an RF data converter subsystem, which contains multiple radio frequency analog-to-digital converters (RF-ADCs) and multiple radio frequency digital-to-analog converters (RF-DACs). In various examples, the RF-ADCs and RF-DACs may be individually configured for real data or can be configured in pairs for real and imaginary I/Q data. In at least some examples, the FPGA architecture 100 may implement an RFSoC device.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAM. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the methods and circuits for predistortion for CATV amplifiers is not limited to the exemplary IC depicted in FIG. 1, and that ICs having other configurations, or other types of ICs, may also implement the methods and circuits for predistortion for CATV amplifiers.

Figure 2:
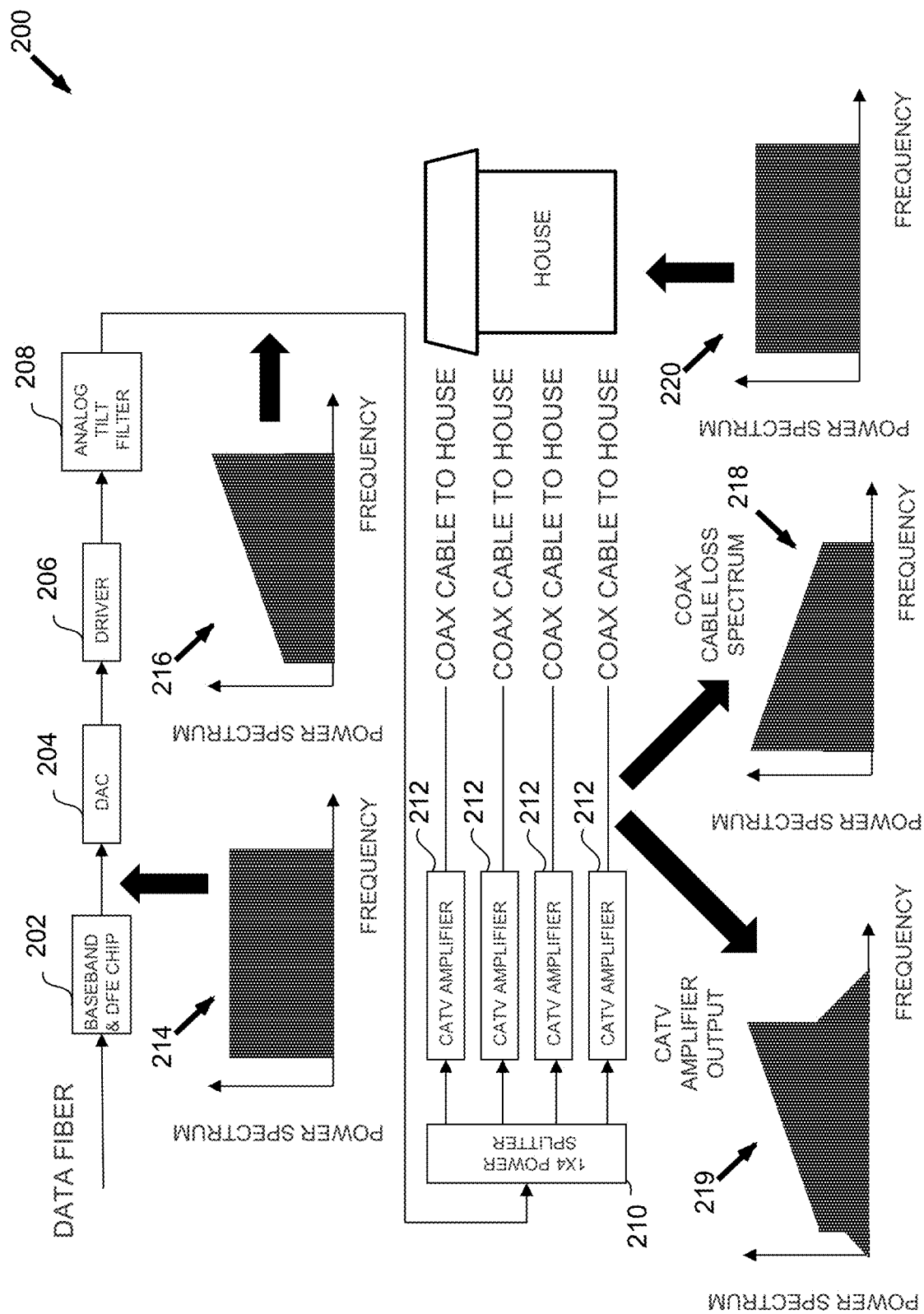
FIG. 2 is a schematic diagram of an exemplary cable network, in accordance with some embodiments.

With reference now to FIG. 2, illustrated therein is a cable network 200 that shows a signal path starting from a data fiber (e.g., which may include an optical fiber), through a remote node, and to an end user location (e.g., at a house). The cable network 200 may be part of a hybrid fiber-coaxial network, where a data fiber is run from a central headend to the remote node, and where coaxial cable is run from the remote node to the end user. In some examples, the remote node includes a remote PHY node based on the DOCSIS 3.1 standards. The remote PHY node, in some embodiments, may include a baseband and digital front-end (DFE) chip 202, a digital-to-analog converter (DAC) 204, a driver 206 (e.g., which may include an amplifier), an analog tilt filter 208, a power splitter 210, and CATV amplifiers 212. In various examples, the baseband and DFE chip 202 may be implemented as a single chip, or as separate chips including a baseband processor chip and a separate DFE chip. In some embodiments, the DAC 204 may be implemented as an RF DAC or an IF DAC, for example, depending on an input to the DAC 204. Additionally, in some embodiments, the baseband and DFE chip 202 and the DAC 204 may be implemented as a single chip (e.g., as in an RFSoC device). Moreover, one or more components of the remote PHY node may be implemented in a programmable logic device, such as the programmable logic device of FIG. 1. As shown in FIG. 2, the data fiber is connected as an input to the baseband and DFE chip 202, the output of the baseband and DFE chip 202 is connected as an input to the DAC 204. A power spectrum 214 (without a slope) provides an example of the shape of the signal at the output of the baseband and DFE chip 202. The output of the DAC 204 is connected as an input to the driver 206, and the output of the driver 206 is connected as an input to the analog tilt filter 208. For cable applications, the analog tilt filter 208 may be used to change a gain across the power spectrum of the signal. Stated another way, the analog tilt filter 208 is used to add a slope in the power levels of the signal across the power spectrum. A power spectrum 216 illustrates the slope (e.g., a positive slope in the present example) in the signal, as compared to the power spectrum 214, at the output of the analog tilt filter 208.

In some embodiments, the output of the analog tilt filter 208 is connected as an input to the power splitter 210. In the example of FIG. 2, the power splitter 210 includes a 1×4 power splitter having a single input and four outputs. However, in some embodiments, the power splitter 210 may include a 1×2 power splitter having a single input and two outputs, a cascade of 1×2 power splitters (e.g., to produce four outputs), or another type of power splitter. In the present example, each of the four outputs of the power splitter 210 is connected as an input to a CATV amplifier 212. The output of each of the CATV amplifiers 212 is then coupled to a coaxial cable which is further coupled to a cable modem at the end user location (e.g., at a house). In at least some embodiments, the cable network 200 implements a Node+0 architecture, which means there are no additional CATV amplifiers (beyond the CATV amplifiers 212 at the remote PHY node) along the coaxial cable path between the remote PHY node and the end user location. FIG. 2 further illustrates a power spectrum 218 showing a coaxial cable loss spectrum (e.g., with a negative slope), a power spectrum 219 showing an output signal of the CATV amplifiers 212, and a power spectrum 220 showing a power spectrum (without a slope) of a signal reaching the end user location. As previously discussed, the analog tilt filter 208 is used to compensate for coaxial cable loss (e.g., from the CATV amplifiers 212 to the cable modem at the end user location).

In at least some existing cable networks, CATV amplifiers operate in a linear region. This means that an amount of non-linearity at an output of a CATV amplifier is low enough that no additional signal processing is needed, and the signal at the output of the CATV amplifier may be sent directly on a coaxial cable to an end user location cable modem for demodulation and information transfer. However, with the transition to the more sophisticated functions and additional power-consuming components associated with DOCSIS 3.1, and because the power supply to each node (e.g., each remote PHY node) is fixed, it would be desirable to reduce the power consumption of other components such as the CATV amplifiers. Currently, CATV amplifiers are around 2-3% efficient, so for example, a single CATV amplifier with 20 Watts of input power would output around ½ Watt of output power. For four CATV amplifiers (e.g., as shown in FIG. 2), 100 Watts of input power would output around 2 Watts of output power. Thus, it is highly desirable to make CATV amplifiers more efficient.

At least one option that is being explored to make CATV amplifiers more efficient is to make the CATV amplifiers operate in a more non-linear region. However, doing so means that the signal at the output of the CATV amplifier may not be sent directly on a coaxial cable to an end user location without some sort of additional digital signal processing, as provided in accordance with embodiments of the present disclosure. For example, embodiments disclosed herein add functionality within the baseband and DFE chip 202, as discussed in more detail below, so that even if the CATV amplifiers operate in a non-linear region, the baseband and DFE chip 202 will be able to invert or change the signal such that the signal at the output of the CATV amplifier will still be linear and can be readily demodulated by a cable modem at the end user location. Stated another way, if a CATV amplifier has a non-linearity 'x', the functionality within the baseband and DFE chip 202 is configured to add inverse non-linearity '1/x' that will be cancelled out by the non-linearity 'x' of the CATV amplifier. As such, the signal at the output of the CATV amplifier is clean and linear. Generally, the process of adding in the non-linearity in advance (e.g., such as adding in the inverse non-linearity at the baseband and DFE chip 202) is called predistorting or predistortion. In the context of the baseband and DFE chip 202, and since distortion is added digitally, the predistortion may be referred to as digital predistortion (DPD). In accordance with various embodiments, the DPD process is performed with the knowledge of the type of non-linearity 'x' that a CATV amplifier (e.g., such as the CATV amplifiers 212) has, so that the DPD process may add the proper inverse non-linearity '1/x'. Moreover, the DPD process is performed with the knowledge of the signal chain between the baseband and DFE chip 202 and the CATV amplifiers 212, including any effects and/or distortions introduced by each of the DAC 204, the driver 206, and the analog tilt filter 208. In various embodiments, by the DPD process disclosed herein, CATV amplifier efficiency is improved and power consumption is reduced.

Figure 3:
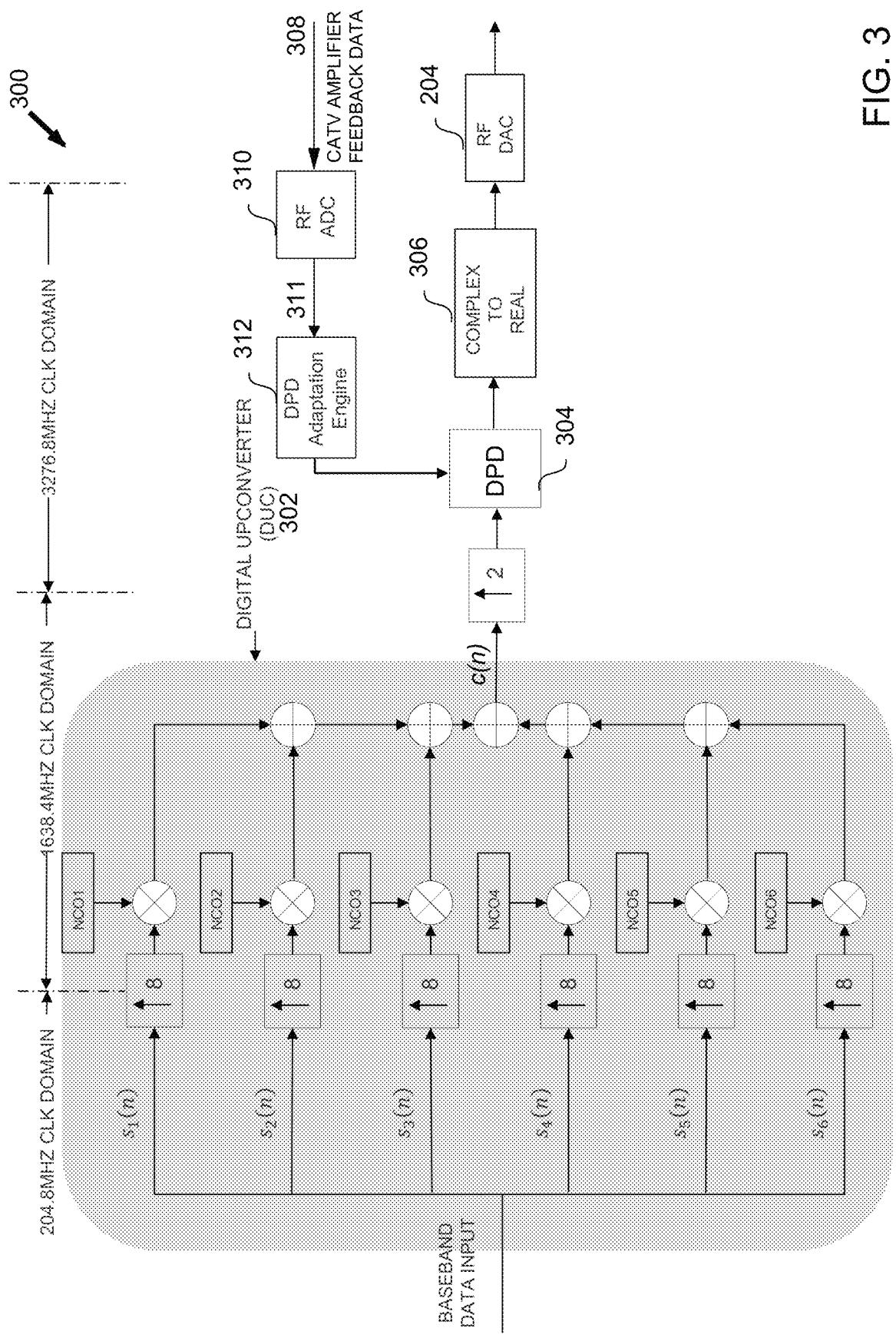
FIG. 3 is a schematic diagram of an exemplary digital front-end (DFE) system, in accordance with some embodiments.

In some embodiments, the functionality within the baseband and DFE chip 202 (configured to add the inverse non-linearity) may be implemented largely as DFE functionality, where a baseband output signal is provided as an input to the DFE chip. As such, and with reference now to FIG. 3, illustrated therein is a DFE system 300 that provides a DFE design configured to carry out one or more aspects of the present disclosure. In some embodiments, the DFE system 300 includes a digital upconverter (DUC) 302. In various examples, the DUC 302 is used to translate one or more channels of data from baseband to a passband signal comprising modulated carriers at a set of one or more specified radio or intermediate frequencies (RF or IF). By way of example, the DUC 302 achieves this by performing interpolation (e.g., to increase the sample rate), filtering (e.g., to provide spectral shaping and rejection of interpolation images), and mixing (e.g., to shift the signal spectrum to the desired carrier frequencies). Generally, the sample rate at the input to the DUC 302 is relatively low; for example, the symbol rate of a digital communications system, while the output is a much higher rate, for example the input sample rate to a DAC, which converts the digital samples to an analog waveform for further analog processing and frequency conversion.

As shown in the example of FIG. 3, a baseband data input is provided to the DUC 302. The baseband data input includes a plurality of different carriers represented as $s_1(n)$, $s_2(n)$, $s_3(n)$, $s_4(n)$, $s_5(n)$, and $s_6(n)$. In some embodiments, the sampling rate of the baseband data input is around 204.8 MHz, corresponding to the OFDM symbol clock. By way of example, the DUC 302 generates the plurality of different carriers (e.g., from the baseband data input) by initially performing interpolation of the baseband data input, which in the present example is used to increase the sampling rate by a factor of eight (8), and thereby transition from a first clock domain (e.g., a 204.8 MHz clock domain) to a second clock domain (e.g., a 1638.4 MHz clock domain). After the interpolation process, each of the plurality of different carriers is mixed with a signal from a numerically controlled oscillator (NCO), each NCO having a different frequency, to shift the frequency of each of the plurality of different carriers to a desired carrier frequency. For example, the carrier $s_1(n)$ is mixed with a first NCO (NCO1) having a first frequency, the carrier $s_2(n)$ is mixed with a second NCO (NCO2) having a second frequency, the carrier $s_3(n)$ is mixed with a third NCO (NCO3) having a third frequency, the carrier $s_4(n)$ is mixed with a fourth NCO (NCO4) having a fourth frequency, the carrier $s_5(n)$ is mixed with a fifth NCO (NCO5) having a fifth frequency, and the carrier $s_6(n)$ is mixed with a sixth NCO (NCO6) having a sixth frequency. After the mixing process, each of the plurality of different carriers are combined to form a composite signal c(n). Thus, the composite signal c(n) includes each of the plurality of different carriers mixed at different frequencies. In some embodiments, and as a result of the mixing process, the composite signal c(n) may look substantially the same as the signal shown in FIG. 5A, where each of the plurality of different carriers are arranged side-by-side in frequency. In some cases, after generation of the composite signal c(n), another interpolation process may be optionally performed, which in the example of FIG. 3 is used to increase the sampling rate of the composite signal c(n) by a factor of two (2), and thereby transition from the second clock domain (e.g., a 1638.4 MHz clock domain) to a third clock domain (e.g., a 3276.8 MHz clock domain). After signal processing by the DUC 302, the composite signal c(n) is provided as an input to a DPD system 304, which is described in more detail below. In some embodiments, the output of the DPD system 304 may undergo complex-to-real signal conversion 306, with the output of the complex-to-real signal conversion 306 provided as input to a DAC (e.g., which may be the DAC 204 of FIG. 2). In addition, one or more components of the DFE system 300 may be implemented in a programmable logic device, such as the programmable logic device of FIG. 1.

As previously discussed, the DPD process, and thus the DPD system 304, functions with the knowledge of the type of non-linearity 'x' that the CATV amplifier has, and with the knowledge of the signal chain between the baseband and DFE chip 202 and the CATV amplifiers 212, so that the DPD system 304 may effectively implement appropriate DPD processes (e.g., including adding the proper inverse non-linearity '1/x'). For example, the DPD system 304 may be used to model the CATV amplifier (e.g., including non-linear effects and the signal chain). As such, the models provided by the DPD system 304 may be generated and/or updated based on feedback data 308, where the feedback data 308 may include an output signal of a CATV amplifier (e.g., such as the CATV amplifier 212). In some embodiments, the feedback data 308 is processed through an analog-to-digital converter (ADC) 310 and provided to a DPD adaptation engine 312 as digital feedback data 311. In various examples, and based on the digital feedback data 311, the DPD adaptation engine 312 updates the DPD system 304 so that the DPD system 304 may adapt to the runtime behavior of the CATV amplifier. More specifically, in some embodiments, the DPD adaptation engine 312 may determine coefficients of filters or configuration of other elements within the DPD system 304, and generally may configure DPD modules, discussed below, within the DPD system 304. Thus, by continuously monitoring and updating the models provided by the DPD system 304 (e.g., via the feedback data 308 and the DPD adaptation engine 312), optimal DPD processes may be implemented. By way of example, aspects of monitoring and updating the models (e.g., such as functionality of the DPD adaptation engine 312) may be implemented as software stored in memory (e.g., within BRAMs 103, or within another on-chip memory location) and executed by one or more on-chip processors (e.g., PROC 110). It is noted that in some embodiments, the baseband and DFE chip 202, the DAC 204, and the ADC 310 may be implemented as a single chip (e.g., as in an RFSoC device). The example of monitoring and updating the models provided above is not meant to be limiting in any way, and it will be understood that while other methods are possible, the embodiments of the present disclosure are not limited by any of the examples provided.

Figure 4:
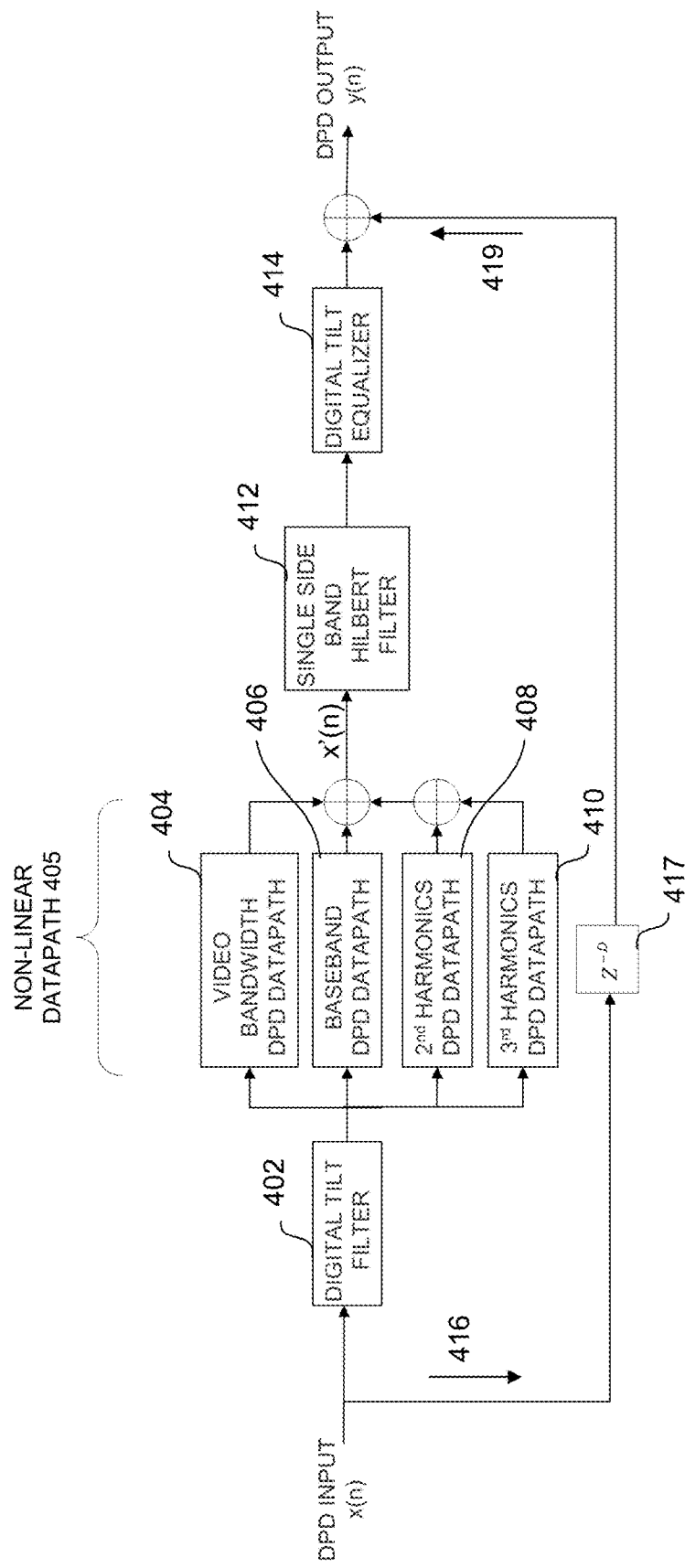
FIG. 4 provides a diagram of a digital predistortion (DPD) system, according to some embodiments.

With reference now to FIG. 4, illustrated therein is a more detailed view of the DPD system 304, described above, that is used to implement various aspects of the present disclosure. As noted above, the DPD system 304 may be used to model the non-linear effects of the CATV amplifier. As such, the models provided by the DPD system 304 may be generated and/or updated based on feedback data (e.g., such as the feedback data 308), where the feedback data may include an output signal of a CATV amplifier processed through an ADC (e.g., such as the ADC 310) and provided to the DPD adaptation engine 312 so that the DPD system 304 may adapt to the non-linear behavior of the CATV amplifier. Thus, the DPD system 304 models of the non-linear effects of the CATV amplifier may be used to implement the various features of the DPD system 304 such as a digital tilt filter 402, a non-linear datapath 405, a single side band Hilbert filter 412, and a digital tilt equalizer 414. It is noted that one or more components of the DPD system 304 may be implemented in a programmable logic device, such as the programmable logic device of FIG. 1.

Still with reference to FIG. 4, the functionality of the DPD system 304 is described in more detail. For example, in some embodiments, a DPD input signal x(n), which may include the composite signal c(n) discussed above, is provided to the digital tilt filter 402. In various cases, the digital tilt filter 402 may be used to model the analog tilt filter 208 (FIG. 2). Thus, by way of example, the output of the digital tilt filter 402 may be similar to the output of the analog tilt filter 208. In some embodiments, the output of the digital tilt filter 402 is provided as an input to the non-linear datapath 405, which includes a plurality of different parallel datapath elements including a video bandwidth DPD datapath 404, a baseband DPD datapath 406, a $2^{nd}$ harmonics DPD datapath 408, and a $3^{rd}$ harmonics DPD datapath 410. In general, the non-linear datapath 405 is used to model and add the inverse non-linear behavior of the CATV amplifier to the incoming signal. More particularly, each of the different parallel datapath elements of the non-linear datapath 405 are used to model and add a different aspect of the inverse non-linear behavior of the CATV amplifier to the incoming signal (e.g., the output of the digital tilt filter 402). For example, the video bandwidth DPD datapath 404 may model and add an inverse non-linear video bandwidth component, the baseband DPD datapath 406 may model and add an inverse non-linear baseband component, the $2^{nd}$ harmonics DPD datapath 408 may model and add an inverse $2^{nd}$ harmonics component, and the $3^{rd}$ harmonics DPD datapath 410 may model and add an inverse $3^{rd}$ harmonics component. As shown, the output of each of the video bandwidth DPD datapath 404, the baseband DPD datapath 406, the $2^{nd}$ harmonics DPD datapath, and the $3^{rd}$ harmonics DPD datapath 410 are then combined to provide a composite signal x'(n) that models the baseband, video, and harmonic components of the CATV amplifier.

In some embodiments, the output of the non-linear datapath 405 (e.g., the composite signal x'(n)) is provided as an input to the single side band Hilbert filter 412, which may be used to further modulate the composite signal x'(n)), and the output of the single side band Hilbert filter 412 is provided as an input to the digital tilt equalizer 414. By way of example, the digital tilt equalizer 414 may be used to model and add the inverse of the analog tilt filter 208 (FIG. 2) to the incoming signal. Thus, by way of example, the output of the digital tilt equalizer 414 may not be affected by (e.g., or may cancel) the effect of the analog tilt filter 208. As shown in FIG. 4, in some embodiments, a DPD input signal x(n), is also transmitted along a path 416, where the path 416 is a linear datapath. In some examples, the datapath 416 may merely introduce a time delay in the DPD input signal x(n) (e.g., at block 417). Moreover, the DPD input signal x(n) transmitted along the datapath 416 bypasses the digital tilt filter 402, the non-linear datapath 405, the single side band Hilbert filter 412 and the digital tilt equalizer 414. As such, the quality of the signal modulation of the DPD input signal x(n) transmitted along the datapath 416 will remain unaffected by the other elements of the DPD system 304. In addition, as shown in FIG. 4, the output of the digital tilt equalizer 414 and the time-delayed DPD input signal x(n) 419 are combined to provide a DPD output signal y(n).

Figure 5A:
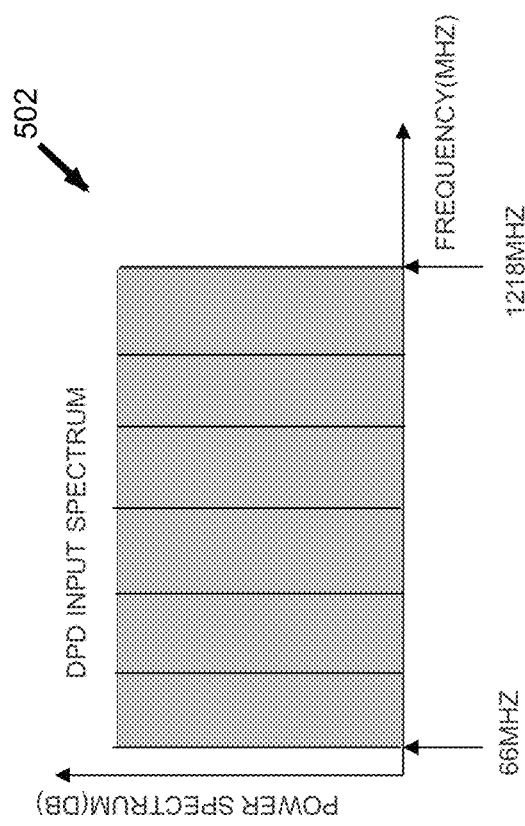
FIGS. 5A and 5B provide an exemplary DPD input spectrum and DPD output spectrum, respectively, in accordance with some embodiments.
Figure 5B:
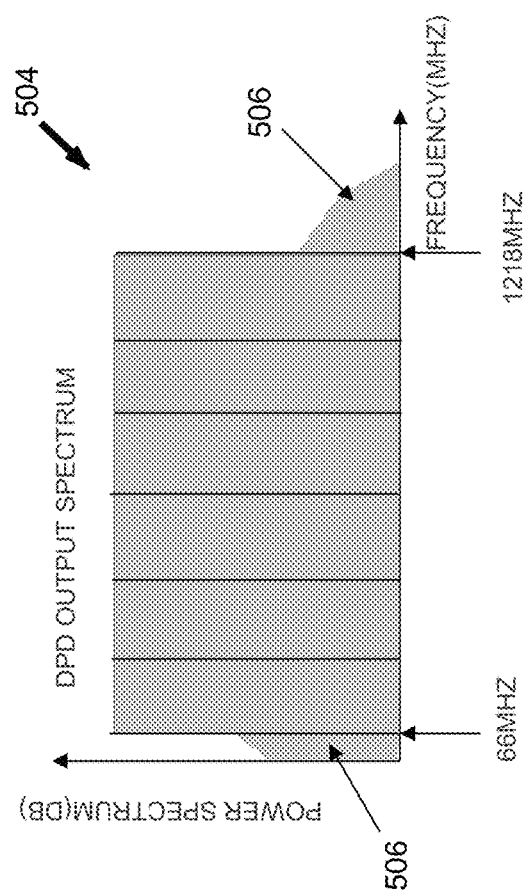

With reference to FIG. 5A, an exemplary DPD input spectrum 502 is provided. In some embodiments, the DPD input signal x(n) (FIG. 4) may include the DPD input spectrum 502. As noted above, the DPD input spectrum 502 may include each of a plurality of different carriers mixed at different frequencies (e.g., by the DUC 302), as previously described, where each of the plurality of different carriers are arranged side-by-side in frequency across a full-bandwidth from about 66 MHz to about 1218 MHz. Referring to FIG. 5B, an exemplary DPD output spectrum 504 is provided. In some embodiments, the DPD output signal y(n) (FIG. 4) may include the DPD output spectrum 504. As shown in FIG. 5B, the DPD output spectrum 504 includes one or more non-linear components 506 that have been added to the signal by the DPD system 304. As described in more detail below, and as a result of processing performed by the DPD system 304, CATV amplifier efficiency and signal quality are improved, and power consumption is reduced.

Figure 6:
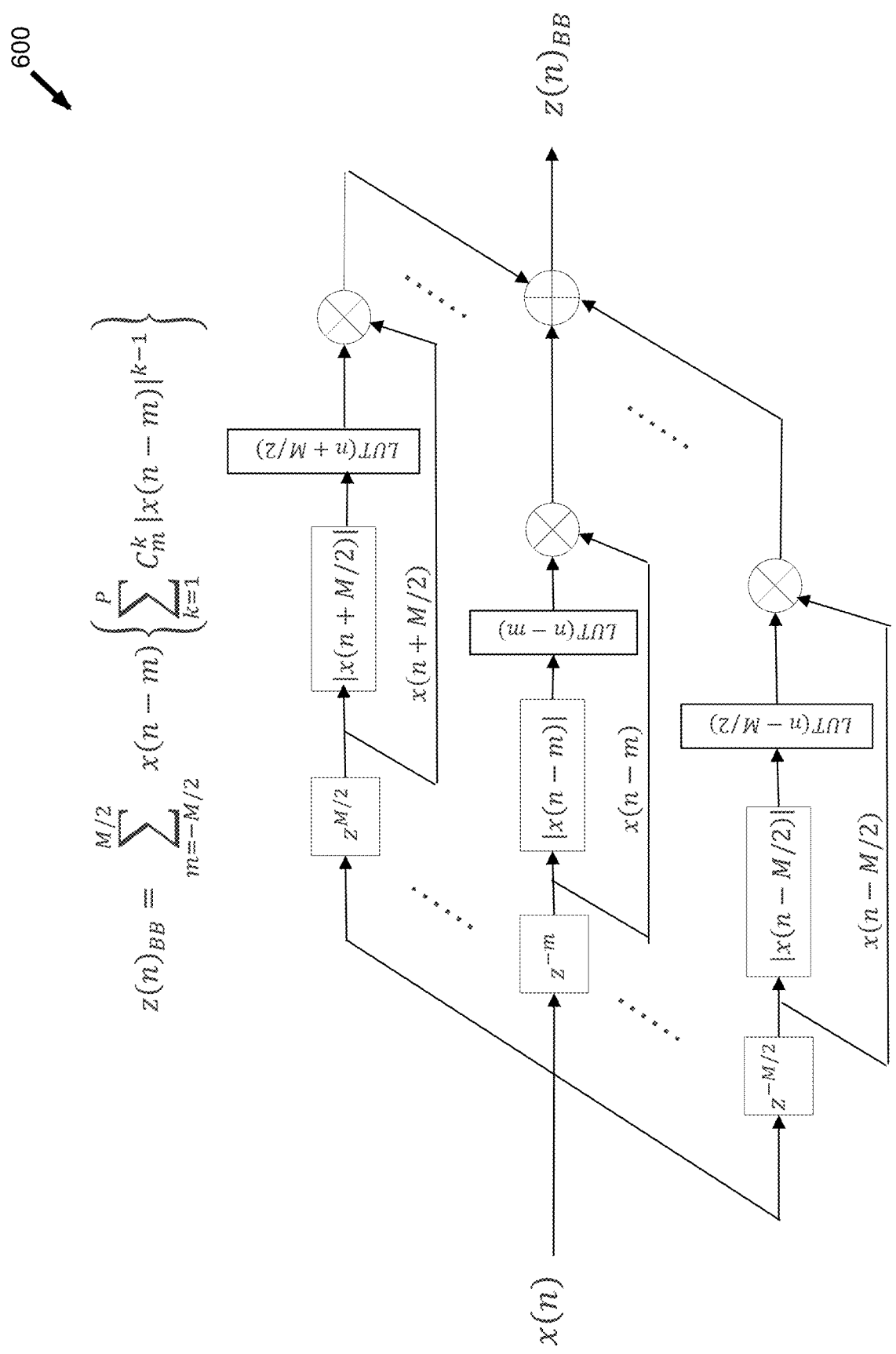
FIGS. 6, 7, 8, and 9 illustrate equations, including diagrammatic representations, that provide derivations for each of the non-linear datapath elements of FIG. 4, in accordance with some embodiments.

Referring now to FIGS. 6-9, illustrated therein are equations, including diagrammatic representations, that show how each of the different parallel datapath elements of the non-linear datapath 405 (FIG. 4) are derived, for example, as a function of the DPD input signal x(n) (FIG. 4). For instance, FIG. 6 provides an equation for deriving the inverse non-linear baseband component, corresponding to the baseband DPD datapath 406, where the equation is expressed as:

$$z(n)_{BB} = \sum_{m=-M/2}^{M/2} x(n-m) \left\{ \sum_{k=1}^{P} C_m^k |x(n-m)|^{k-1} \right\}$$

Figure 7:
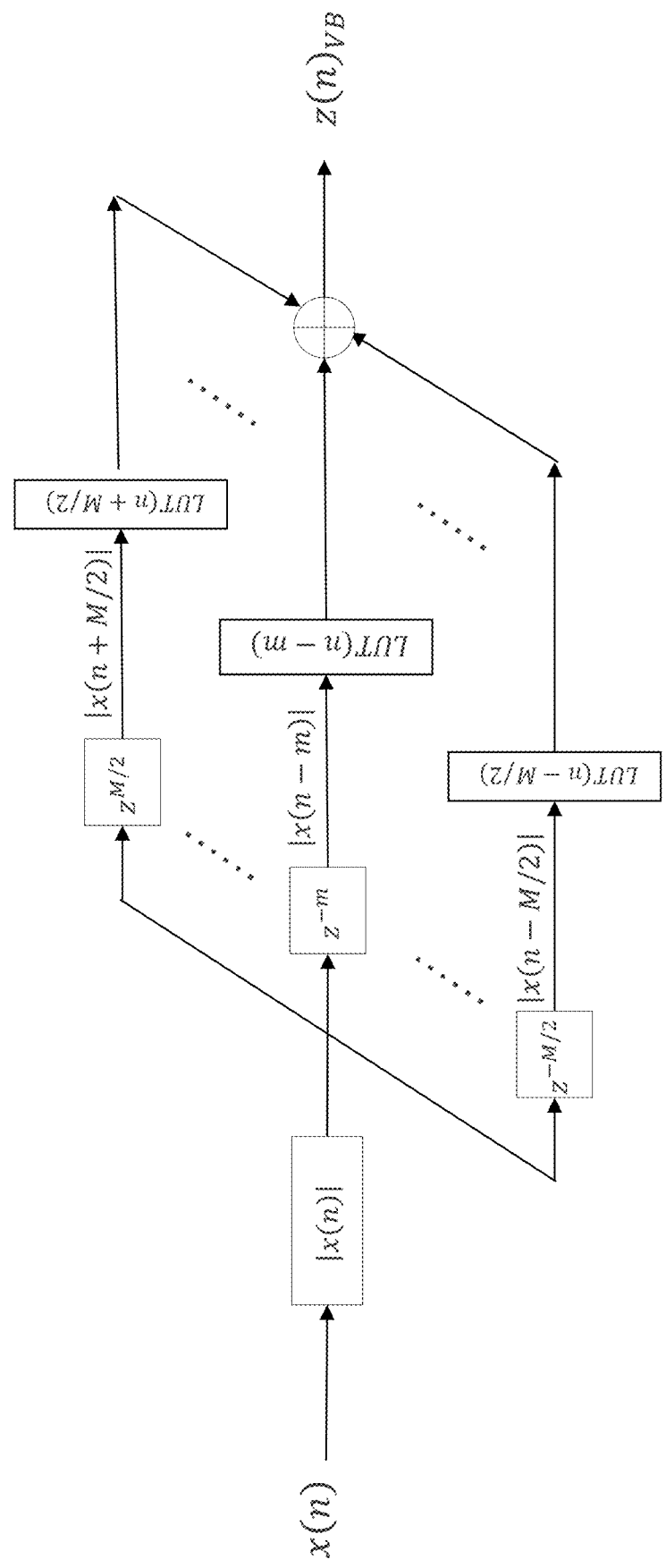

FIG. 7 provides an equation for deriving the inverse non-linear video bandwidth component, corresponding to the video bandwidth DPD datapath 404, where the equation is expressed as:

$$z(n)_{VB} = \sum_{m=-M/2}^{M/2} \left\{ \sum_{k=1}^{P/2} D_m^k |x(n-m)|^{2k} \right\}$$

Figure 8:
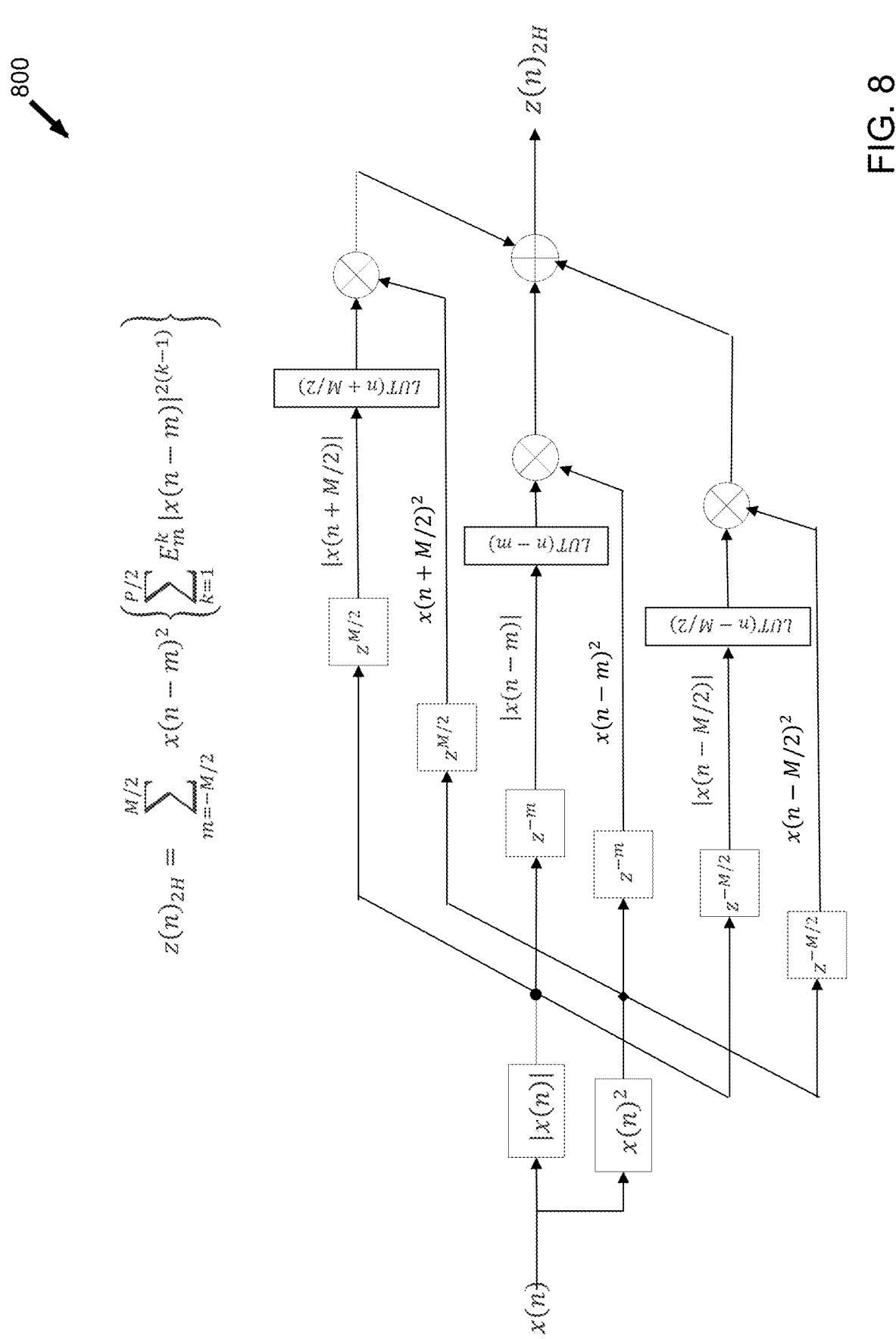

FIG. 8 provides an equation for deriving the inverse $2^{nd}$ harmonics component, corresponding to the $2^{nd}$ harmonics DPD datapath 408, where the equation is expressed as:

$$z(n)_{2H} = \sum_{m=-M/2}^{M/2} x(n-m)^2 \left\{ \sum_{k=1}^{P/2} E_m^k |x(n-m)|^{2(k-1)} \right\}$$

Figure 9:
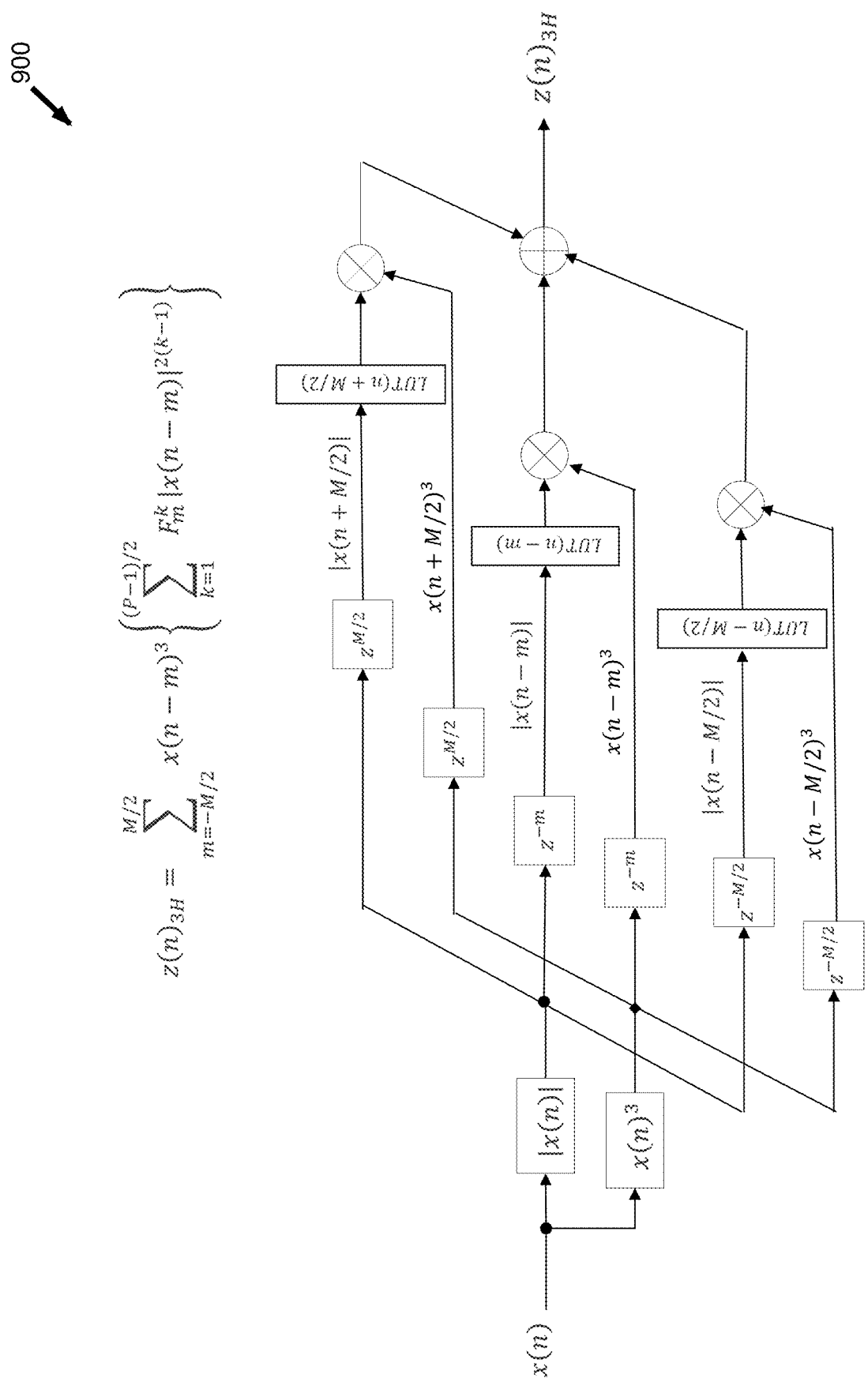

FIG. 9 provides an equation for deriving the inverse $3^{rd}$ harmonics component, corresponding to the $3^{rd}$ harmonics DPD datapath 410, where the equation is expressed as:

$$z(n)_{3H} = \sum_{m=-M/2}^{M/2} x(n-m)^3 \left\{ \sum_{k=1}^{(P-1)/2} F_m^k |x(n-m)|^{2(k-1)} \right\}$$

Figure 10:
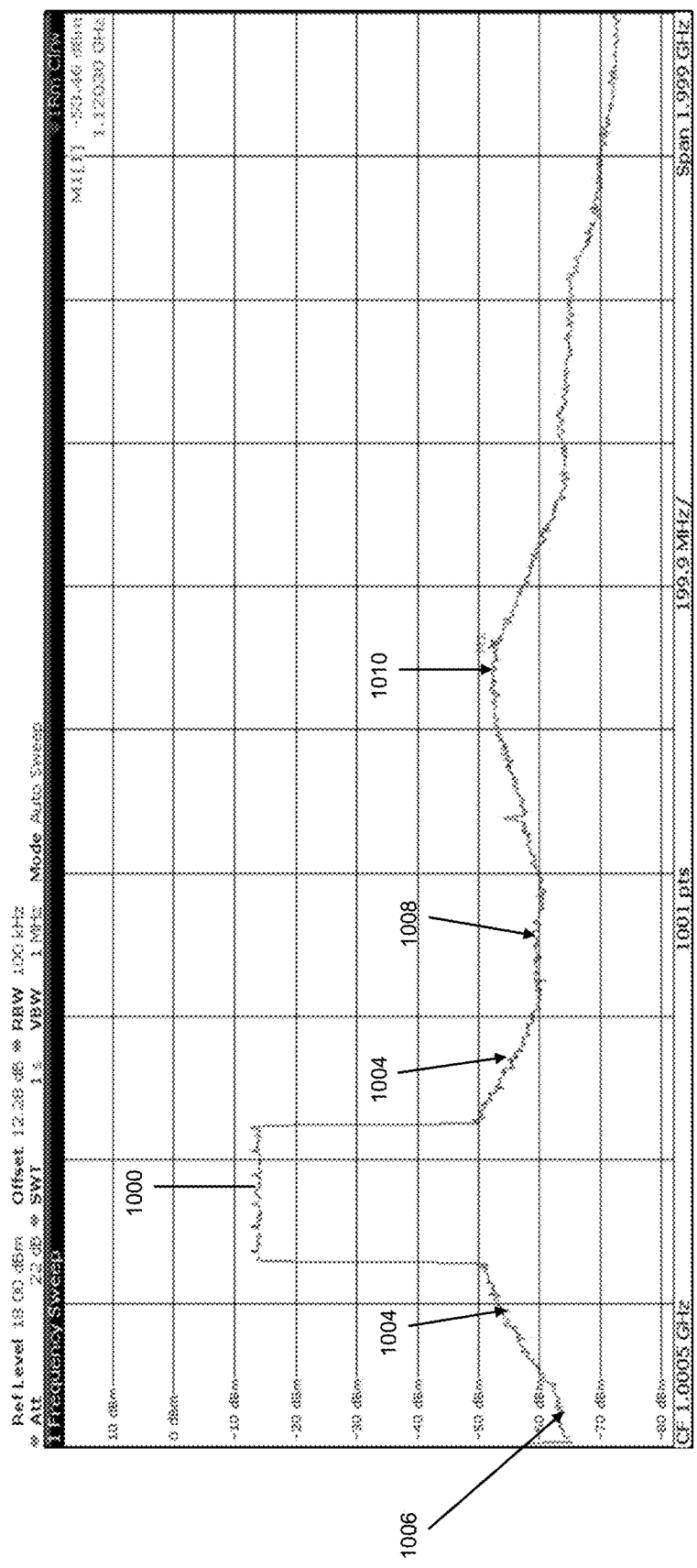
FIG. 10 illustrates a power spectrum for a single carrier showing the non-linear effects of a CATV amplifier, according to some embodiments.

With reference now to FIGS. 10-16, shown therein is a plurality of data that illustrates at least some of the benefits and advantages of the various embodiments of the present disclosure. Referring first to FIG. 10, illustrated therein is a power spectrum 1000 for a single carrier that shows the non-linear effects of a CATV amplifier. The power spectrum 1000, and the power spectrums of FIGS. 11-15, are generated using a spectrum analyzer using a resolution bandwidth of 100 kHz and a video bandwidth of 1 MHz. In the present example, the carrier frequency for the single carrier is equal to 254 MHz, with the CATV amplifier operating at V=34V, with a bias current=320 mA, and a CATV amplifier output=76 dbmV. In some embodiments, the waveform illustrated for the power spectrum 1000 is a 4K QAM DOCSIS 3.1 waveform. As shown in FIG. 10, the power spectrum 1000 further includes non-linear baseband components 1004, a non-linear video bandwidth component 1006, a $2^{nd}$ harmonics component 1008, and a $3^{rd}$ harmonics component 1010. As mentioned above, the power spectrum 1000 is for a single carrier. However, consider having a plurality of different carriers arranged side-by-side in frequency, as previously discussed. In such a case, the non-linear components of the power spectrum 1000 (e.g., the non-linear baseband components 1004, the non-linear video bandwidth component 1006, the $2^{nd}$ harmonics component 1008, and the $3^{rd}$ harmonics component 1010) would certainly affect and degrade the power spectrum of neighboring carriers.

Figure 11:
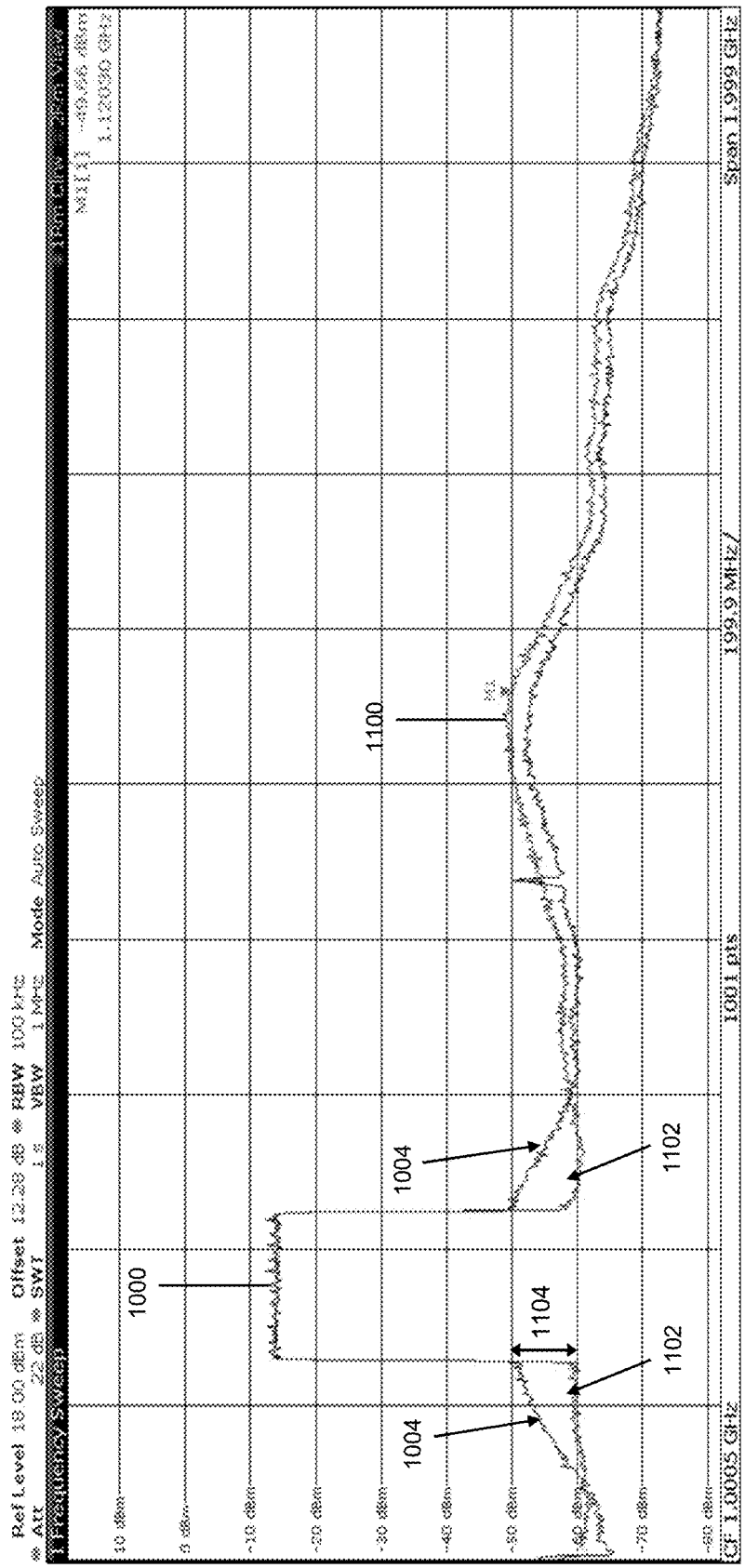
FIG. 11 illustrates a power spectrum showing the result of applying a baseband DPD correction to the power spectrum of FIG. 10, according to some embodiments.

Referring now to FIG. 11, illustrated therein is the power spectrum 1000 (including the non-linear effects of a CATV amplifier) and a power spectrum 1100 superimposed over the power spectrum 1000, showing the result of applying a baseband DPD correction. Stated another way, the power spectrum 1100 illustrates the beneficial effect (e.g., at the output of the CATV amplifier) of adding the inverse non-linear baseband component by way of the baseband DPD datapath 406. In particular, as shown in FIG. 11 and as a result of applying the baseband DPD correction, the non-linear baseband components 1004 of the power spectrum 1000 have been corrected (removed), as shown by components 1102 of the power spectrum 1100. In the example of FIG. 11, the baseband DPD correction results in about a 10 dB improvement in the power spectrum 1100, as indicated by arrow 1104.

Figure 12:
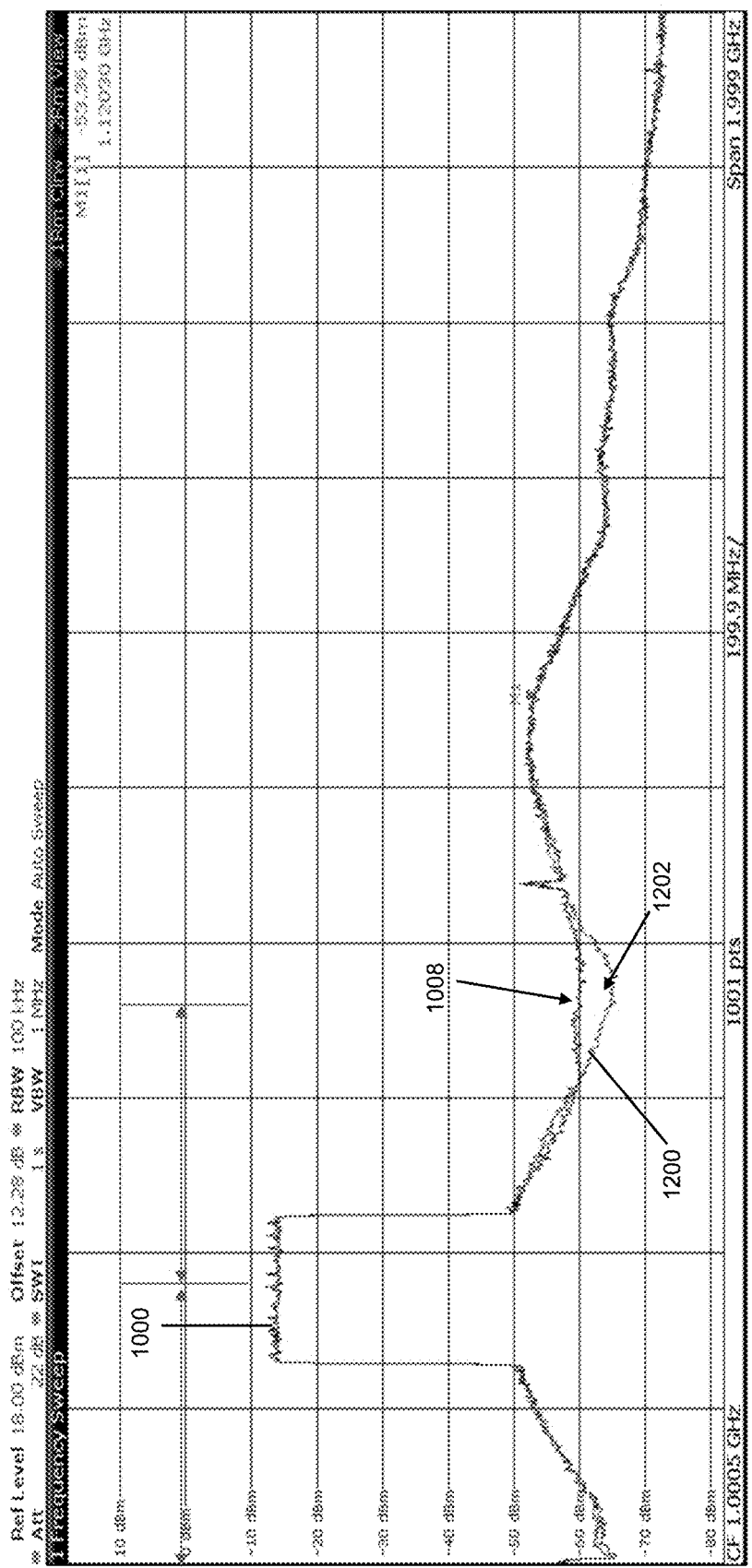
FIG. 12 illustrates a power spectrum showing the result of applying a $2^{nd}$ harmonics DPD correction to the power spectrum of FIG. 10, according to some embodiments.

FIG. 12 illustrates the power spectrum 1000 (including the non-linear effects of a CATV amplifier) and a power spectrum 1200 superimposed over the power spectrum 1000, showing the result of applying a $2^{nd}$ harmonics DPD correction. Stated another way, the power spectrum 1200 illustrates the beneficial effect (e.g., at the output of the CATV amplifier) of adding the inverse $2^{nd}$ harmonics component by way of the $2^{nd}$ harmonics DPD datapath 408. In particular, as shown in FIG. 12 and as a result of applying the $2^{nd}$ harmonics correction, the $2^{nd}$ harmonics component 1008 of the power spectrum 1000 have been corrected (removed), as shown by component 1202 of the power spectrum 1200. As shown in the example of FIG. 12, the $2^{nd}$ harmonics DPD correction results in about a 5 dB improvement in the power spectrum 1200.

Figure 13:
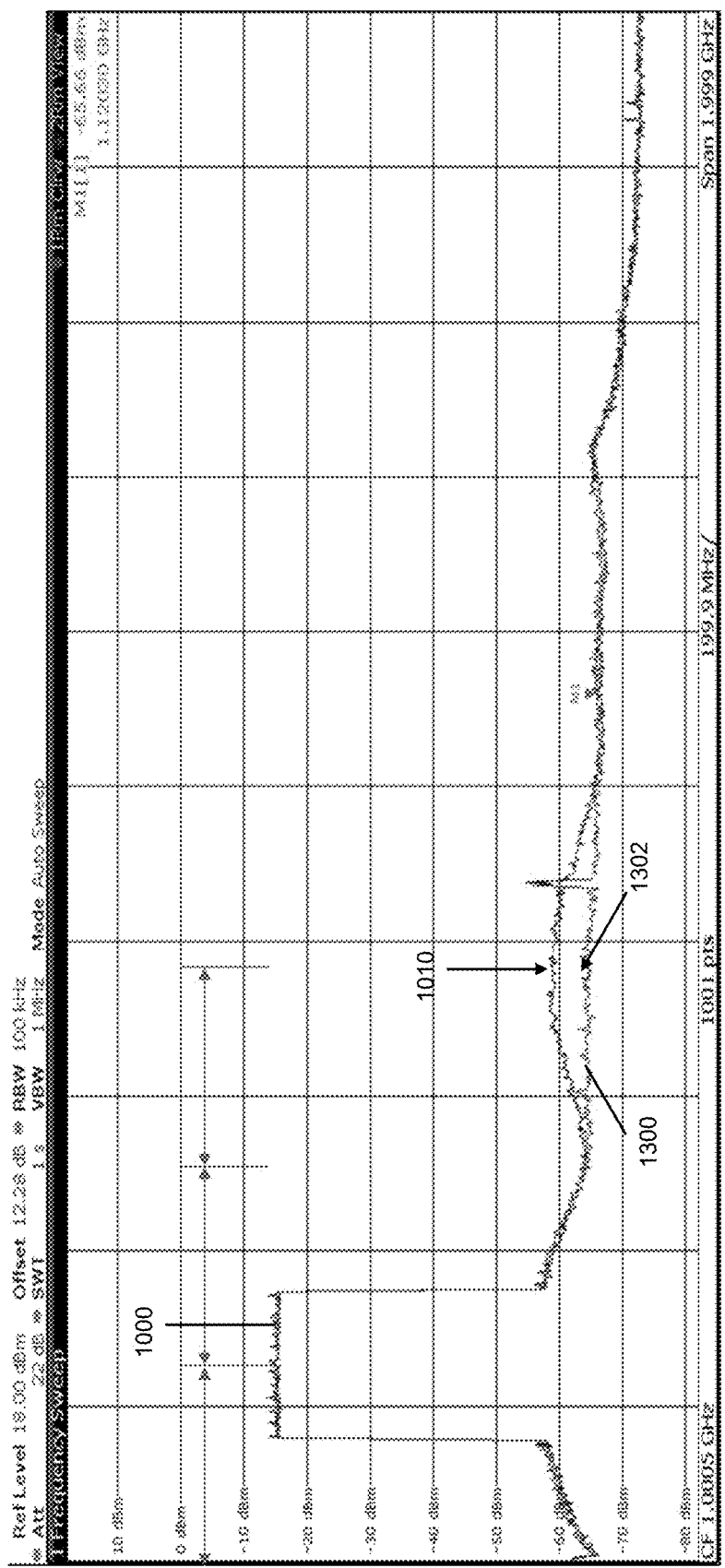
FIG. 13 illustrates a power spectrum showing the result of applying a $3^{rd}$ harmonics DPD correction to the power spectrum of FIG. 10, according to some embodiments.

With reference to FIG. 13, illustrated therein is the power spectrum 1000 (including the non-linear effects of a CATV amplifier) and a power spectrum 1300 superimposed over the power spectrum 1000, showing the result of applying a $3^{rd}$ harmonics DPD correction. Stated another way, the power spectrum 1300 illustrates the beneficial effect (e.g., at the output of the CATV amplifier) of adding the inverse $3^{rd}$ harmonics component by way of the $3^{rd}$ harmonics DPD datapath 410. In particular, as shown in FIG. 13 and as a result of applying the $3^{rd}$ harmonics correction, the $3^{rd}$ harmonics component 1010 of the power spectrum 1000 have been corrected (removed), as shown by component 1302 of the power spectrum 1300. As shown in the example of FIG. 13, the $3^{rd}$ harmonics DPD correction results in about a 5 dB improvement in the power spectrum 1300.

Figure 14:
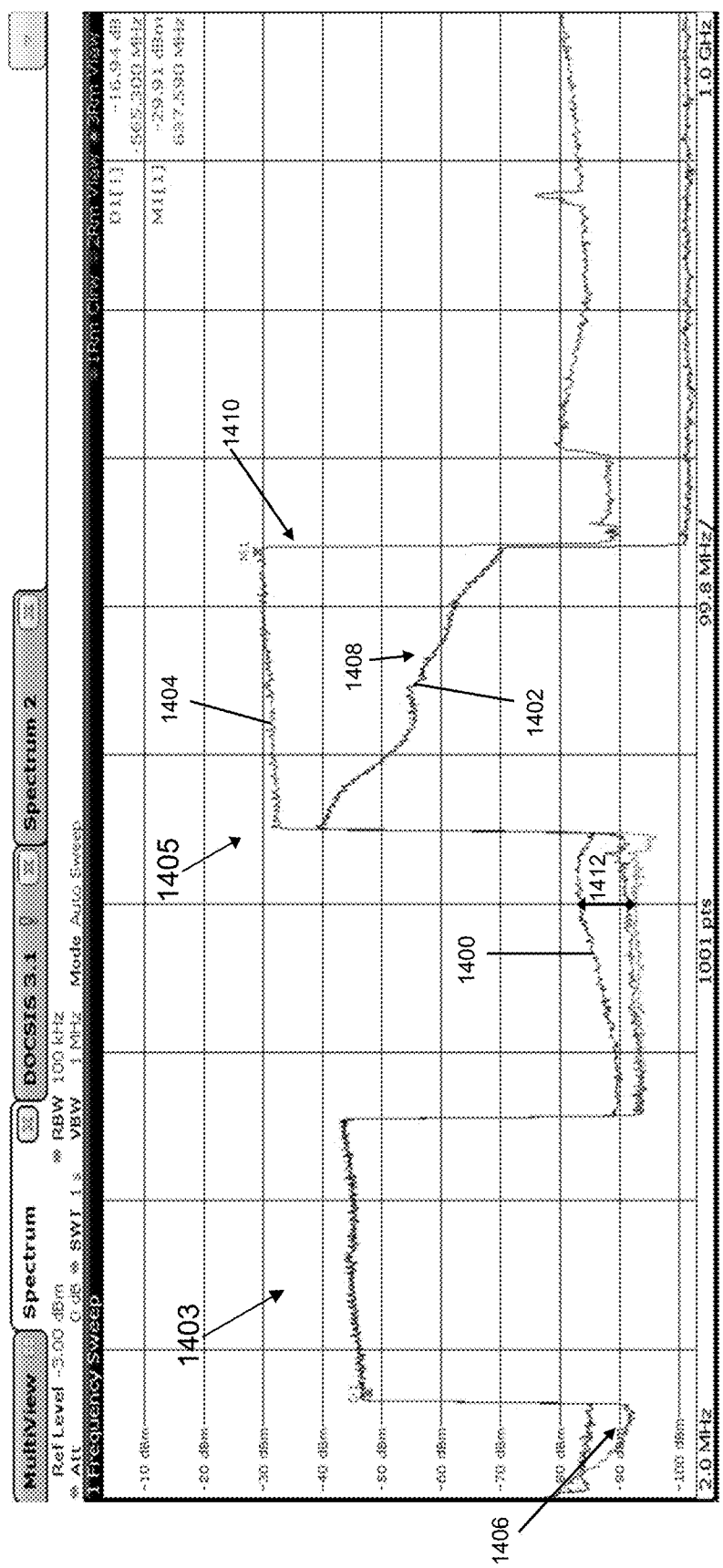
FIG. 14 illustrates a power spectrum showing the result of applying both a baseband DPD correction and a video bandwidth DPD correction, according to some embodiments.

Referring to FIG. 14, illustrated therein is a power spectrum 1400 for two carriers 1403, 1405 that show the non-linear effects of a CATV amplifier. FIG. 14 also includes a power spectrum 1402 superimposed over the power spectrum 1400, showing the result of applying a baseband DPD correction, and a power spectrum 1404 superimposed over the power spectrums 1400 and 1402, showing the result of applying both a baseband DPD correction and a video bandwidth DPD correction. Stated another way, the power spectrum 1402 illustrates the beneficial effect (e.g., at the output of the CATV amplifier) of adding the inverse non-linear baseband component by way of the baseband DPD datapath 406. Similarly, the power spectrum 1404 illustrates the beneficial effect (e.g., at the output of the CATV amplifier) of adding both the inverse non-linear baseband component by way of the baseband DPD datapath 406, and the inverse non-linear video bandwidth component by way of the video bandwidth DPD datapath 404. As a result of applying the baseband DPD correction alone (power spectrum 1402), the power spectrum 1402 illustrates the corrections (e.g., as indicated by arrow 1412), as compared to the power spectrum 1400. Also, as a result of applying the baseband DPD correction and the video bandwidth DPD correction (power spectrum 1404), the power spectrum 1404 illustrates the corrections (e.g., as indicated by arrows 1406 and 1410), as compared to the power spectrum 1400. In particular, the improvement exhibited in the power spectrum 1404 in the region indicated by the arrow 1410, for example as compared to the region indicated by arrow 1408 (e.g., prior to applying the baseband DPD correction and the video bandwidth DPD correction), is especially pronounced. This is because the carrier 1405 has a higher power, resulting in a higher level of non-linearity. As such, the carrier 1405 will benefit even more from the corrections provided by the DPD system 304.

Figure 15:
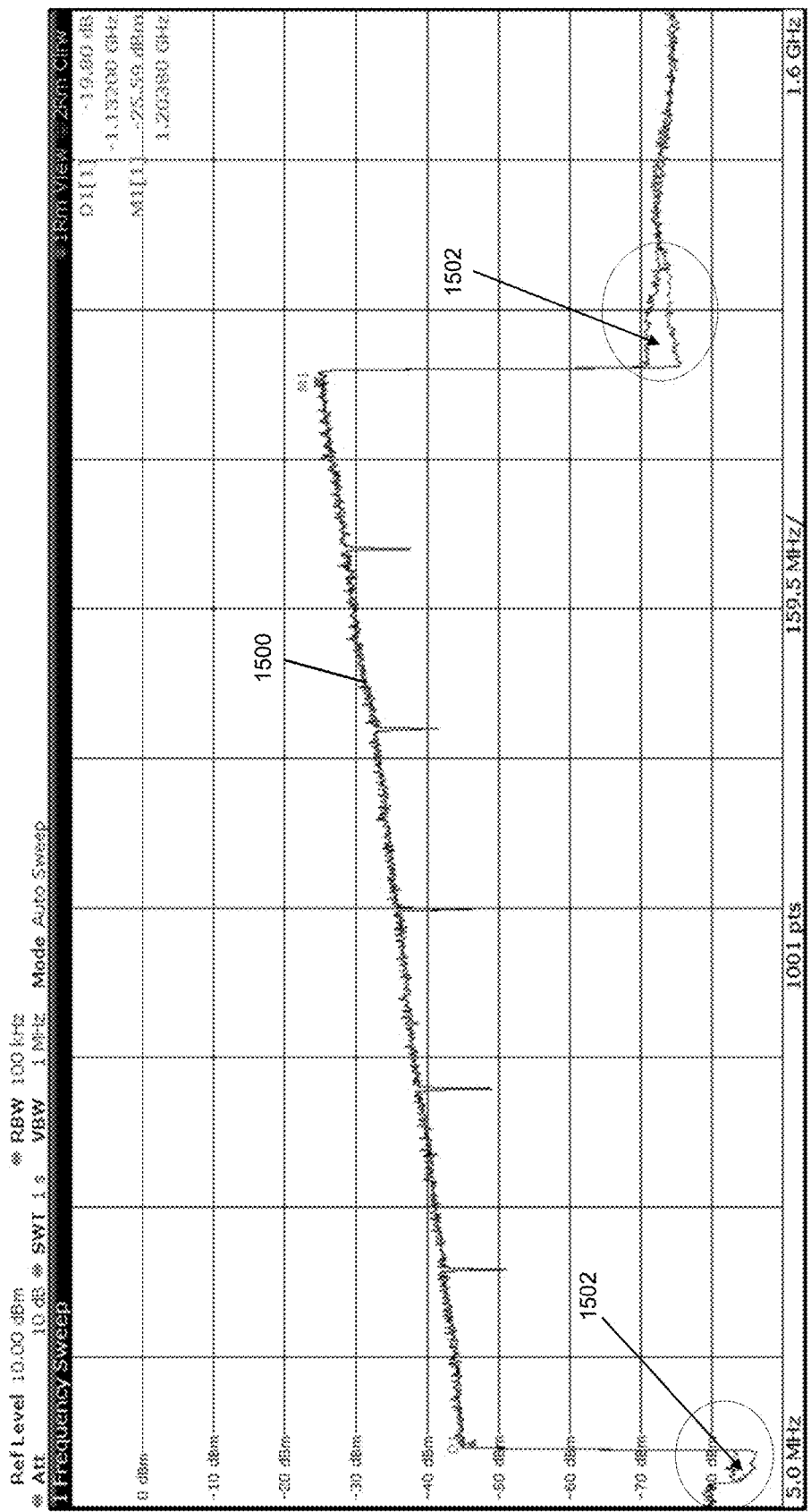
FIG. 15 illustrates a power spectrum showing an adjacent channel power ratio (ACPR) correction arising from application of the corrections provided by the DPD system, in accordance with some embodiments.

FIG. 15 illustrates a power spectrum 1500 including six different carriers arranged side-by-side in frequency across a full-bandwidth from about 66 MHz to about 1218 MHz. In some embodiments, the waveform illustrated for the power spectrum 1500 is a 4K QAM DOCSIS 3.1 waveform. In some examples, the power spectrum 1500 may be at the output of the analog tilt filter 208 (FIG. 2). FIG. 15 also illustrates an adjacent channel power ratio (ACPR) correction 1502 arising from application of the corrections provided by the DPD system 304, as discussed above. For purposes of this disclosure, ACPR may be described as a ratio of the power in an adjacent channel to a main channel power, and it is desirable that ACPR values be as low as possible. Thus, the ACPR correction 1502 shown in FIG. 15 is advantageous.

With reference to FIG. 16, illustrated therein is a table including modulation error ratio (MER) data for a CATV amplifier showing the effect of applying the corrections provided by the DPD system 304 on the MER data. By way of example, MER is a measure used to quantify the performance of a digital radio (or digital TV) transmitter or receiver in a communications system using digital modulation (such as QAM). For the example of FIG. 16, the CATV amplifier module under test is operable at V=34V. To compare the MER data to cable industry specifications: MER=41 dB, 4KQAM, 76.8 dbmV/75Ω. The CATV amplifier is tested with six carriers, where the first carrier is a 4K QAM signal with a carrier frequency of 204 MHz, the second carrier is a 4K QAM signal with a carrier frequency of 396 MHz, the third carrier is a 4K QAM signal with a carrier frequency of 588 MHz, the fourth carrier is a 4K QAM signal with a carrier frequency of 786 MHz, the fifth carrier is a 4K QAM signal with a carrier frequency of 930 MHz, and the sixth carrier is a 4K QAM signal with a carrier frequency of 1122 MHz. In a first test 1602, with the CATV amplifier operating with a bias current of 530 mA and without DPD corrections, the sixth carrier does not meet the specification of MER=41 dB. However, with DPD corrections applied (e.g., by the DPD system 304), all of the carriers meet the MER specification. In the second test 1604, with the CATV amplifier operating with a bias current of 440 mA (a reduction of about 3 Watts per amplifier as compared to operating with a bias current of 530 mA) and without DPD corrections, all tested carriers do not meet the specification of MER=41 dB. However, with DPD corrections applied (e.g., by the DPD system 304), all of the carriers meet the MER specification.

Figure 17:
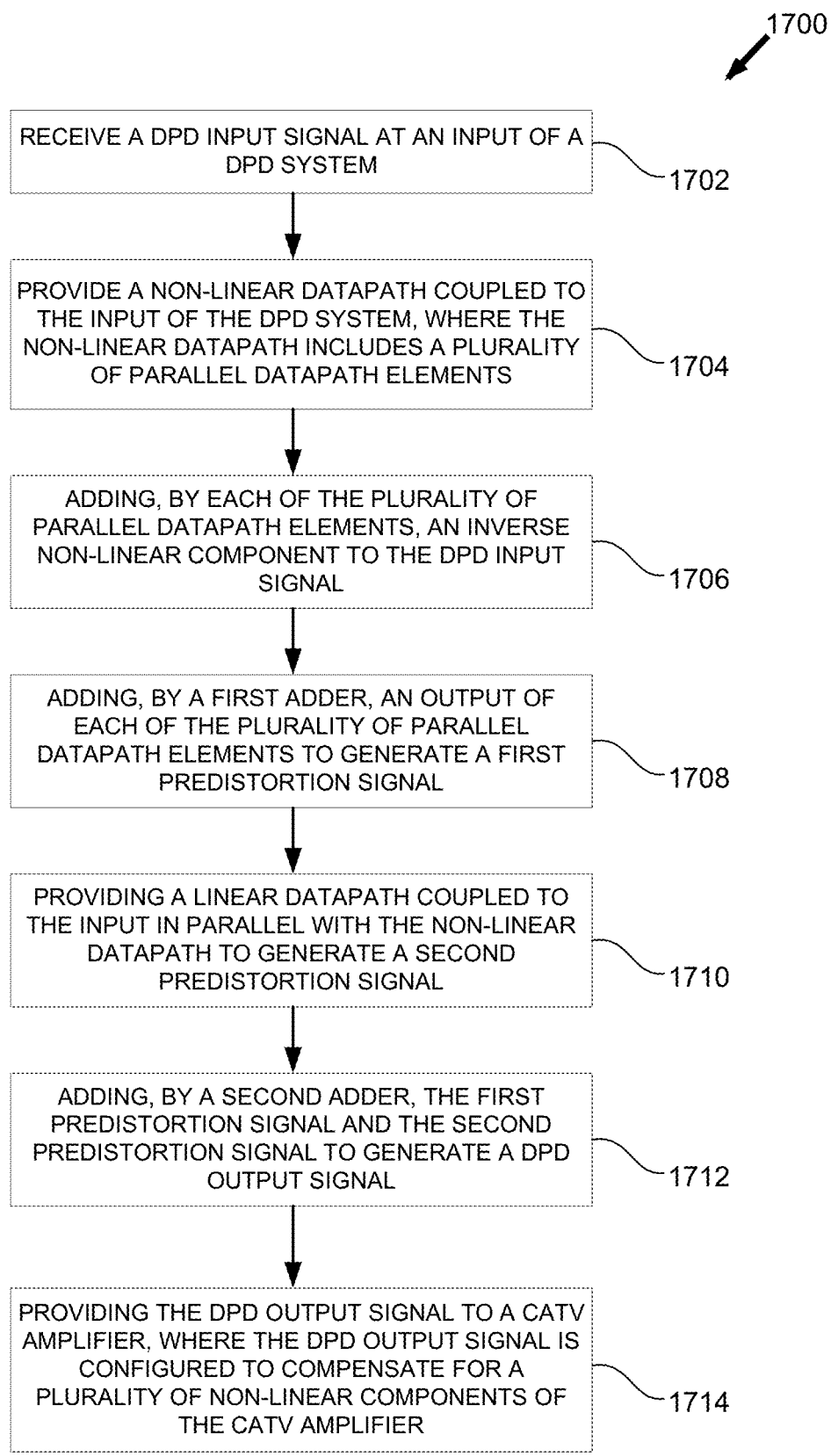
FIG. 17 is a flow diagram illustrating a method for performing a digital predistortion process in a DPD system, according to some embodiments.

Referring now to FIG. 17, illustrated therein is a method 1700 for performing a digital predistortion process in a DPD system, in accordance with various embodiments. The method 1700 begins at block 1702 where a DPD input signal is received at an input of a DPD system, such as the DPD system 304 of FIG. 4. As discussed above, and in some embodiments, the DPD input signal may include the DPD input signal x(n) (FIG. 4), which may further include the composite signal c(n) generated by the DUC 302 (FIG. 3). In some examples, the method 1700 proceeds to block 1704 where a non-linear datapath coupled to the input of the DPD system is provided. For example, the non-linear datapath may include the non-linear datapath 405 of FIG. 4. As such, the non-linear datapath may include a plurality of parallel datapath elements. In some examples, the plurality of parallel datapath elements includes the video bandwidth DPD datapath 404, the baseband DPD datapath 406, the $2^{nd}$ harmonics DPD datapath 408, and the $3^{rd}$ harmonics DPD datapath 410. In some embodiments, the method 1700 proceeds to block 1706 where each of the different parallel datapath elements may be used to add a different aspect of the inverse non-linear behavior of a CATV amplifier to an incoming signal. In some examples, the method 1700 then proceeds to block 1708 where a first combiner combines an output of each of the plurality of parallel datapath elements to generate a first predistortion signal. In some cases, the first predistortion signal may include the composite signal x'(n) (FIG. 4) that models the baseband, video, and harmonic components of the CATV amplifier. In some embodiments, the method 1700 proceeds to block 1710 where a linear datapath coupled to the input in parallel with the non-linear datapath is provided, and where the linear datapath generates a second predistortion signal. In some embodiments, the second predistortion signal may include the time-delayed DPD input signal x(n) 419 (FIG. 4). The method then proceeds to block 1712 where a second combiner combines the first predistortion signal and the second predistortion signal to generate a DPD output signal. In some embodiments, the DPD output signal may include the DPD output signal y(n) (FIG. 4). In various embodiments, the method proceeds to block 1714 where the DPD output signal is provided to a CATV amplifier (e.g., such as the CATV amplifiers 212 of FIG. 2). In accordance with embodiments of the present disclosure, the DPD output signal is configured to compensate for a plurality of non-linear components of the CATV amplifier. It will be understood that additional method steps may be implemented before, during, and after the method 1700, and some method steps described above may be replaced or eliminated in accordance with various embodiments of the method 1700, without departing from the scope of the present disclosure.

It is noted that various configurations (e.g., the components of the cable network 200, the DFE system 300, and the DPD system 304, the number of parallel datapath elements in FIG. 4, as well as other features and components illustrated in the figures) are exemplary only and not intended to be limiting beyond what is specifically recited in the claims that follow. It will be understood by those skilled in the art that other configurations may be used. Also, while an exemplary cable network 200 is illustrated, the DPD system disclosed herein may be used to in other communication systems, for example where the other communication systems deploy an amplifier exhibiting detrimental non-linear behavior.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A digital predistortion (DPD) system, comprising:
an input configured to receive a DPD input signal including a complex positive frequency domain signal;
a non-linear datapath coupled to the input, wherein the non-linear datapath includes a plurality of parallel datapath elements each coupled to the input, wherein each of the plurality of parallel datapath elements is configured to add a different inverse non-linear component to the complex positive frequency domain signal, wherein each of the different inverse non-linear components correspond to a non-linear component of a cable TV (CATV) amplifier, wherein a first combiner is configured to combine an output of each of the plurality of parallel datapath elements to generate a predistortion signal, and wherein a first frequency of the predistortion signal is the same as a second frequency of the complex positive frequency domain signal received by the input of the DPD system;
a linear datapath coupled to the input in parallel with the non-linear datapath, wherein an output of the linear datapath is equal to the DPD input signal; and
a second combiner configured to combine the predistortion signal and the output of the linear datapath to generate a DPD output signal;
wherein a DPD system configuration is configured to be updated, by a DPD adaptation module operating independent of the DPD output signal, based on an entire CATV amplifier output signal received by the DPD adaptation module; and
wherein a signal path between the CATV amplifier and the DPD adaptation module, by which the DPD adaptation module receives the entire CATV amplifier output signal, is filter-free.

2. The DPD system of claim 1, wherein the plurality of parallel datapath elements includes a baseband DPD datapath, a video bandwidth DPD datapath, a $2^{nd}$ harmonics DPD datapath, and a $3^{rd}$ harmonics DPD datapath.

3. The DPD system of claim 2, wherein the baseband DPD datapath is configured to add an inverse non-linear baseband component to the DPD input signal.

4. The DPD system of claim 2, wherein the video bandwidth DPD datapath is configured to add an inverse non-linear video bandwidth component to the DPD input signal.

5. The DPD system of claim 2, wherein the $2^{nd}$ harmonics DPD datapath is configured to add an inverse $2^{nd}$ harmonics component to the DPD input signal.

6. The DPD system of claim 2, wherein the $3^{rd}$ harmonics DPD datapath is configured to add an inverse $3^{rd}$ harmonics component to the DPD input signal.

7. The DPD system of claim 1, further comprising:
a digital tilt filter configured to model an analog tilt filter, wherein a digital tilt filter input is coupled to the input, and wherein a digital tilt filter output is coupled to the non-linear datapath.

8. The DPD system of claim 1, further comprising:
a digital tilt equalizer configured to model an inverse of an analog tilt filter, wherein a digital tilt equalizer input is configured to receive the predistortion signal, and wherein the second combiner is configured to combine a digital tilt equalizer output to the output of the linear datapath to generate the DPD output signal.

9. The DPD system of claim 8, further comprising:
a single side band Hilbert filter, wherein a single side band Hilbert filter input is configured to receive the predistortion signal, and wherein a single side band Hilbert filter output is coupled to the digital tilt equalizer input.

10. The DPD system of claim 1, wherein the entire CATV amplifier output signal received by the DPD adaptation module spans an entire bandwidth of the entire CATV amplifier output signal.

11. A digital front-end (DFE) system configured to perform a digital predistortion (DPD) process, the DFE system comprising:
a digital upconverter (DUC) configured to receive and translate a baseband data input signal to generate a composite signal including a complex positive frequency domain signal;
a DPD system configured to receive the composite signal at a DPD input and perform the DPD process to the composite signal, wherein the DPD input is coupled to a plurality of parallel datapath elements along a first datapath, wherein at least one of the plurality of parallel datapath elements is configured to add an inverse harmonic component to the complex positive frequency domain signal, wherein the inverse harmonic component corresponds to a non-linear harmonic component of an amplifier, wherein a combiner is configured to combine an output of each of the plurality of datapath elements to generate a first signal, wherein a first frequency of the first signal is the same as a second frequency of the complex positive frequency domain signal received by the DPD input of the DPD system, and wherein another combiner is configured to combine the first signal to a second signal received from a second datapath to generate a DPD output signal, wherein an output of the second datapath is equal to the composite signal;
a digital-to-analog converter (DAC) configured to receive the DPD output signal, wherein a DAC output signal is coupled to the amplifier;
an analog-to-digital converter (ADC) configured to receive an entire amplifier output signal; and
a DPD adaptation module operating independent of the DPD output signal and configured to receive an ADC output signal, wherein a DPD adaptation module output signal is coupled to the DPD system, and wherein a DPD system configuration is configured to be updated based on the entire amplifier output signal;
wherein the DPD output signal is configured to compensate for the non-linear harmonic component of the amplifier; and
wherein a signal path between the amplifier and the DPD adaptation module, by which the DPD adaptation module receives the entire amplifier output signal, is filter-free.

12. The DFE system of claim 11, wherein the plurality of parallel datapath elements includes a baseband DPD datapath, a video bandwidth DPD datapath, a $2^{nd}$ harmonics DPD datapath, and a $3^{rd}$ harmonics DPD datapath.

13. The DFE system of claim 11, wherein the DUC is configured to perform an interpolation process to the baseband data input signal to generate an interpolated signal, and wherein the DUC is configured to perform a mixing process to the interpolated signal to generate the composite signal.

14. The DFE system of claim 11, wherein the DPD system further comprises:
a digital tilt filter configured to model an analog tilt filter, wherein a digital tilt filter input is configured to receive the composite signal, and wherein a digital tilt filter output is coupled to the plurality of parallel datapath elements.

15. The DFE system of claim 11, wherein the DPD system further comprises:
a digital tilt equalizer configured to model an inverse of an analog tilt filter, wherein a digital tilt equalizer input is configured to receive the first signal, and wherein the another combiner is configured to combine a digital tilt equalizer output to the second signal to generate the DPD output signal.

16. The DFE system of claim 11, wherein the DAC, the ADC, the DPD system, and the DPD adaptation module are implemented on a single radio frequency system-on-chip (RFSoC) die.

17. A method, comprising:
receiving a DPD input signal at an input of a digital predistortion (DPD) system, wherein the DPD input signal includes a complex positive frequency domain signal;
receiving the DPD input signal at a non-linear datapath coupled to the input of the DPD system, wherein the non-linear datapath includes a plurality of parallel datapath elements each coupled to the input;
adding, by each of the plurality of parallel datapath elements, an inverse non-linear component to the complex positive frequency domain signal, wherein the inverse non-linear component corresponds to a non-linear component of an amplifier;
combining, by a first combiner, an output of each of the plurality of parallel datapath elements to generate a predistortion signal, wherein a first frequency of the predistortion signal is the same as a second frequency of the complex positive frequency domain signal received by the input of the DPD system;
receiving the DPD input signal at a linear datapath coupled to the input in parallel with the non-linear datapath, wherein an output of the linear datapath is equal to the DPD input signal;
combining, by a second combiner, the predistortion signal and the output of the linear datapath to generate a DPD output signal; and
updating, by a DPD adaptation module operating independent of the DPD output signal, a configuration of the DPD system, wherein the DPD adaptation module updates the configuration based on an entire amplifier output signal;

wherein a signal path between the amplifier and the DPD adaptation module, by which the DPD adaptation module receives the entire amplifier output signal, is filter-free.

18. The method of claim 17, wherein the plurality of parallel datapath elements includes a baseband DPD datapath, a video bandwidth DPD datapath, a $2^{nd}$ harmonics DPD datapath, and a $3^{rd}$ harmonics DPD datapath.

19. The method of claim 18, further comprising:
adding, by the baseband DPD datapath, an inverse non-linear baseband component to the DPD input signal;
adding, by the video bandwidth DPD datapath, an inverse non-linear video bandwidth component to the DPD input signal;
adding, by the $2^{nd}$ harmonics DPD datapath, an inverse $2^{nd}$ harmonics component to the DPD input signal; and
adding, by the $3^{rd}$ harmonics DPD datapath, an inverse $3^{rd}$ harmonics component to the DPD input signal.

20. The method of claim 17, further comprising:
providing the DPD output signal to an amplifier input to generate an amplified output signal, wherein the DPD output signal is configured to compensate for a plurality of non-linear components of the amplifier.

* * * * *